United States Patent
Ryu et al.

(10) Patent No.: US 11,853,637 B2
(45) Date of Patent: Dec. 26, 2023

(54) ELECTRONIC DEVICE FOR SYNCHRONIZING OUTPUT TIME POINT OF CONTENT OUTPUT BY EXTERNAL DEVICES AND METHOD OF OPERATING SAME

(71) Applicant: Samsung Electronics Co., Ltd., Gyeonggi-do (KR)

(72) Inventors: Kyusang Ryu, Gyeonggi-do (KR); Jinho Kim, Gyeonggi-do (KR); Eunyoung Park, Gyeonggi-do (KR); Hongbum Park, Gyeonggi-do (KR); Gwanyeol Lee, Gyeonggi-do (KR); Sungjun Choi, Gyeonggi-do (KR); Sungpill Hwang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 233 days.

(21) Appl. No.: 17/429,202

(22) PCT Filed: Jul. 5, 2021

(86) PCT No.: PCT/KR2021/008527
§ 371 (c)(1),
(2) Date: Aug. 6, 2021

(87) PCT Pub. No.: WO2022/025463
PCT Pub. Date: Feb. 3, 2022

(65) Prior Publication Data
US 2023/0176804 A1    Jun. 8, 2023

(30) Foreign Application Priority Data
Jul. 29, 2020    (KR) .................... 10-2020-0094196

(51) Int. Cl.
G06F 3/14    (2006.01)

(52) U.S. Cl.
CPC ................................ *G06F 3/1454* (2013.01)

(58) Field of Classification Search
CPC ......... H04N 21/4302; H04N 21/43076; H04N 21/242; H04N 5/04; H04N 21/4122; H04N 21/4341; G06F 3/1454
See application file for complete search history.

(56) References Cited

U.S. PATENT DOCUMENTS 8,316,154 B2 * 11/2012 Yoneda ................ H04L 12/282
                                                        709/248
9,386,065 B2    7/2016 Lee et al.
(Continued)

FOREIGN PATENT DOCUMENTS

EP          3 379 853           9/2018
KR       1020150026069          3/2015
(Continued)

OTHER PUBLICATIONS

International Search Report dated Oct. 14, 2021 issued in counterpart application No. PCT/KR2021/008527, 13 pages.

*Primary Examiner* — Koosha Sharifi-Tafreshi
(74) *Attorney, Agent, or Firm* — The Farrell Law Firm, P.C.

(57) ABSTRACT

Disclosed is an electronic device including a first communication circuit configured to transmit content to a first external electronic device through first communication, a second communication circuit configured to transmit content to a second electronic device connected to a second external electronic device through second communication, and a processor configured to identify a first time spent for processing a content output operation by the first external electronic device, identify a second time spent for processing a content output operation by the second external electronic device, and control a time for which the content is transmitted to the first external electronic device and/or (Continued)

the second electronic device, based on a result of a comparison between the first time and the second time.

20 Claims, 17 Drawing Sheets

(56) References Cited

U.S. PATENT DOCUMENTS

| | | |
|---|---|---|
| 9,998,703 B2 | 6/2018 | Greene et al. |
| 10,044,912 B2 | 8/2018 | Shiohara |
| 10,082,998 B2 | 9/2018 | Chu et al. |
| 11,282,546 B2* | 3/2022 | Olofsson ................. G11B 27/11 |
| 2015/0067016 A1 | 3/2015 | Park et al. |
| 2015/0081068 A1* | 3/2015 | Cheng .................. H04N 21/436 |
| | | 700/94 |
| 2015/0095962 A1* | 4/2015 | Kim ................... H04N 21/2665 |
| | | 725/110 |
| 2018/0279050 A1 | 9/2018 | Ryu |
| 2019/0297373 A1 | 9/2019 | Nakajima |
| 2020/0128291 A1 | 4/2020 | Morales et al. |

FOREIGN PATENT DOCUMENTS

| | | |
|---|---|---|
| KR | 1020170019816 | 2/2017 |
| KR | 10-1779737 | 9/2017 |
| KR | 10-1917174 | 11/2018 |

* cited by examiner

ELECTRONIC DEVICE FOR SYNCHRONIZING OUTPUT TIME POINT OF CONTENT OUTPUT BY EXTERNAL DEVICES AND METHOD OF OPERATING SAME

PRIORITY

This application is a National Phase Entry of PCT International Application No. PCT/KR2021/008527, which was filed on Jul. 5, 2021, and claims priority to Korean Patent Application No. 10-2020-0094196, which was filed on Jul. 29, 2020, the entire content of each of which is incorporated herein by reference.

TECHNICAL FIELD

The disclosure relates generally to an electronic device, and more particularly, to an electronic device and a method for synchronizing an output time point of content output by external devices.

BACKGROUND ART

Various electronic devices, such as smart phones, tablet personal computers (PCs), portable multimedia players (PMPs), personal digital assistants (PDAs), laptop PCs, and wearable devices, have been developed and distributed in recent times.

The electronic device supports various communication means and may transmit or receive data or content to or from an external electronic device connected through such communication means. Due to appearance of various content, an electronic device that supports a function for sharing content between electronic devices has recently been released. The electronic device may share content with another electronic device, and another electronic device receiving content may output the content through an external electronic device, such as wireless earphones or a Bluetooth제 speaker connected to the other electronic device.

However, in the conventional content sharing method, every external electronic device may have a different content output time point. A quality of communication between electronic devices sharing content with external electronic devices and a quality of communication between electronic devices receiving content from external electronic devices tends to vary, thereby causing the external electronic devices to have different content output time points.

As these different content output time points impose an inconvenience to the user in enjoying the content, there is a need in the art for an electronic device and method that synchronizes the content output time points, thereby providing a more enjoyable user experience.

DISCLOSURE OF INVENTION

Technical Problem

However, in the content sharing method, every external electronic device may have a different content output time point. A quality of communication between electronic devices sharing content with external electronic devices and a quality of communication between electronic devices receiving content from external electronic devices may be different, and different communication qualities may cause the external electronic devices to have different content output time points.

The different content output time points may cause users to feel inconvenience in enjoying the content.

Solution to Problem

Accordingly, an aspect of the disclosure is to provide an electronic device and a method of operating the electronic device which can compare a first time spent for outputting content to a first external electronic device and a second time spent for outputting the content to a second external electronic device and control content output time points to be synchronized based on the comparison result.

Another aspect of the disclosure is to provide an electronic device and a method of operating the electronic device that can control content display time points of the electronic device to be synchronized based on a first time spent for outputting content to a first external electronic device and a second time spent for outputting the content to a second external electronic device.

In accordance with an aspect of the disclosure, an electronic device includes a first communication circuit configured to transmit content to a first external electronic device through first communication, a second communication circuit configured to transmit content to a second electronic device connected to a second external electronic device through second communication, and a processor configured to identify a first time spent for processing a content output operation by the first external electronic device, identify a second time spent for processing a content output operation by the second external electronic device, and control a time for which the content is transmitted to the first external electronic device and/or the second electronic device, based on a result of a comparison between the first time and the second time.

In accordance with another aspect of the disclosure, a method of operating an electronic device includes identifying a first time spent for processing a content output operation by a first external electronic device connected to the electronic device through a first communication, identifying a second time spent for processing a content output operation by a second external electronic device connected to a second electronic device connected to the electronic device through a second communication, and controlling a time for which the content is transmitted to the first external electronic device and/or the second electronic device, based on a result of a comparison between the first time and the second time.

Advantageous Effects of Invention

An electronic device and a method of operating the electronic device according to various embodiments can compare a first time spent for outputting content to a first external electronic device and a second time spent for outputting the content to a second external electronic device and control content output time points to be synchronized on the basis of the comparison result.

An electronic device and a method of operating the electronic device according to various embodiments can control content display time points of the electronic device to be synchronized on the basis of a first time spent for outputting content to a first external electronic device and a second time spent for outputting the content to a second external electronic device.

MODE FOR THE INVENTION

Figure 1:
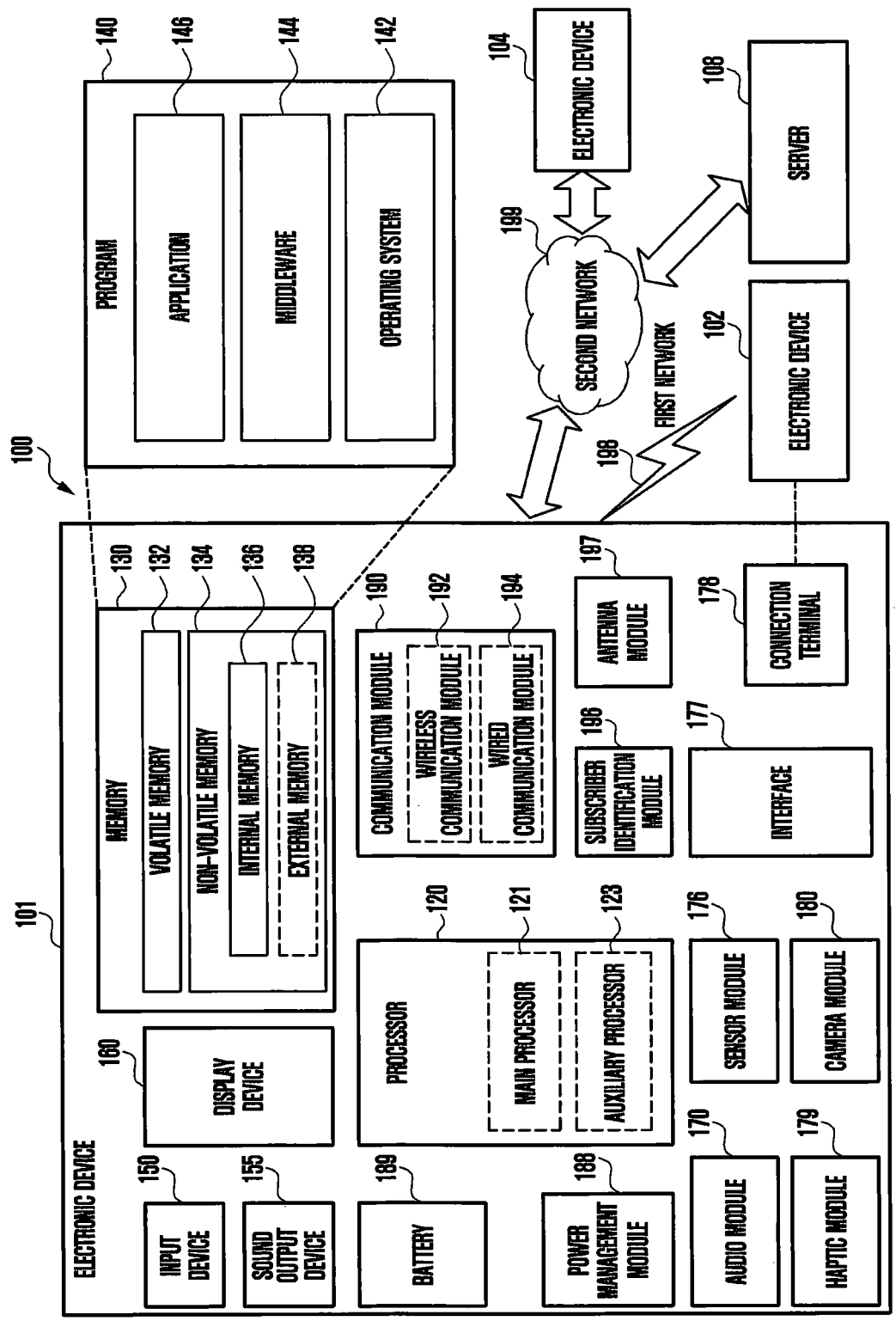
FIG. 1 is a block diagram of an electronic device according to an embodiment.

Embodiments of the disclosure will be described in detail with reference to the accompanying drawings. Detailed descriptions of known functions and/or configurations will be omitted for the sake of clarity and conciseness.

The electronic device herein may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another and do not limit the components in other aspect (e.g., importance or order). It is to be understood that if a first element is referred to, with or without the term "operatively" or "communicatively", as "coupled with," "coupled to," "connected with," or "connected to" a second element, this indicates that the element may be coupled with the second element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
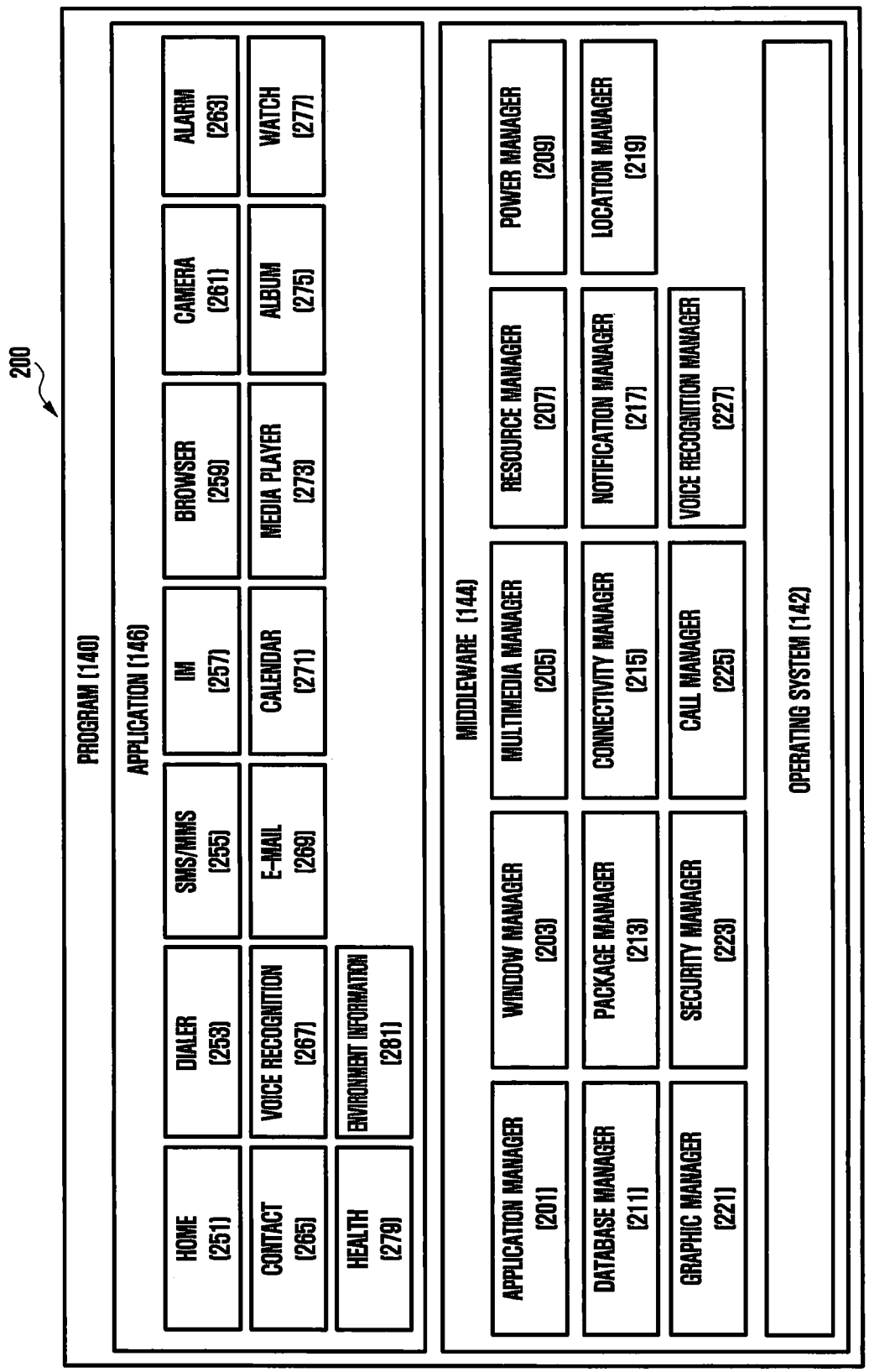
FIG. 2 is a block diagram of a program according to an embodiment.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocating) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
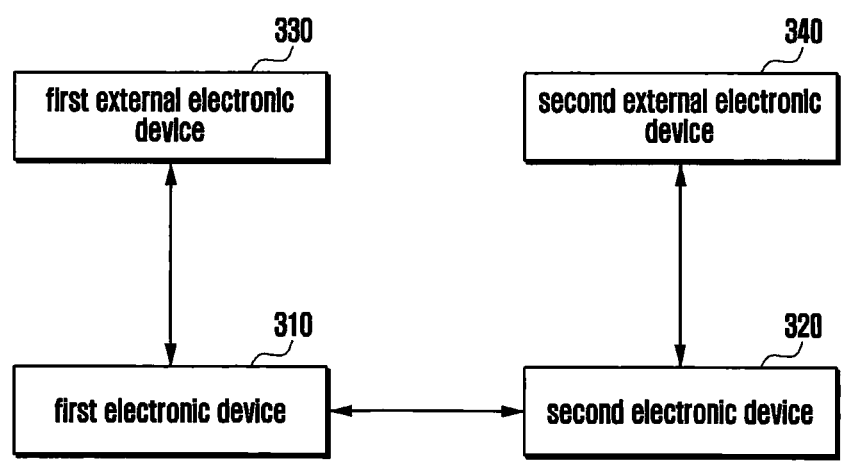
FIG. 3 illustrates a first electronic device, a second electronic device, a first external electronic device, and a second external electronic device according to an embodiment.

FIG. 3 illustrates a first electronic device, a second electronic device, a first external electronic device, and a second external electronic device according to an embodiment.

A first electronic device 310 may be connected to a first external electronic device 330 through first communication and transmit content to the first external electronic device 330 through the first communication. The first external electronic device 330 may include various electronic devices, such as earphones, a speaker, a display, a head-up display (HUD) included within a vehicle, or a vehicle system) capable of being connected to the first electronic device 310 through the first communication. The first external electronic device 330 is paired or connected with the first electronic device 310 and may receive data from the first electronic device 310 and perform various operations based on the received data. For example, the first external electronic device 330 may be an output device, such as a speaker or a display) for outputting content and may receive content from the first electronic device 310 and output the received content. The first communication is different than second communication that is a communication scheme for the connection between the first electronic device 310 and the second electronic device 320 and may include short-range wireless communication. For example, the first communication may include at least one communication among Bluetooth™ or Bluetooth low energy (BLE).

The second electronic device 320 is connected to the first electronic device 310 through the second communication and may transmit or receive data to or from the first electronic device 310 through the second communication. The second communication is a different communication scheme than the first communication that is a communication scheme for the connection between the first electronic device 310 and the first external electronic device 330 and may include short-range wireless communication based on neighbor awareness networking (NAN). For example, the second communication may include Wi-Fi awareness-based communication defined in Wi-Fi or a communication scheme defined in Wi-Fi Direct.

The second electronic device 320 is connected to the second external electronic device 340 through the first communication and may transmit or receive data to or from the second external electronic device 340. The second external electronic device 340 may include various electronic devices, such as a speaker, a display, a HUD included within a vehicle, or a vehicle system, capable of being connected to the second electronic device 320 through the first communication. The second external electronic device 340 is paired or connected with the second electronic device 320 and may receive data from the second electronic device 320 and perform various operations based on the received data. For example, the second external electronic device 340 may be an output device, such as a speaker or a display for outputting content, and the second external electronic device 340 may receive data from the second electronic device 320 and output the received data. The first communication is different than second communication that is a communication scheme for the connection between the first electronic device 310 and the second electronic device 320 and may include short-range wireless communication. For example, the first communication may include at least one communication among Bluetooth™ and BLE.

The first electronic device 310 may output content temporarily or nontemporarily stored in the first electronic device 310 to the first external electronic device 330 and/or the second external electronic device 340. In this case, the first electronic device 310 is directly connected to the second external electronic device 340 and may transmit data including at least some of the content to the second external electronic device 340. However, it may be |difficult|[RC1] to connect the first electronic device 310 with the second external electronic device 340 for various reasons, such as when the number of electronic devices which can be connected to the first electronic device 310 and/or the second external electronic device 340 is limited or when the first electronic device 310 and the second external electronic device 340 are spaced apart from each other by at least a predetermined distance.

The first electronic device 310 may transmit data including at least some of the content to the second external electronic device 340 through the second electronic device 320 in order to output the content to the second external electronic device 340. Thus, the first electronic device 310 may output the content to the first external electronic device 330 and/or the second external electronic device 340. However, a delay time may be generated for various reasons, such as a channel state of wireless communication between the first external electronic device 330 and the first electronic device 310, a channel state of wireless communication between the first electronic device 310 and the second electronic device, and/or a channel state of wireless communication between the second external electronic device 340 and the second electronic device 320. The generation of the delay time may generate a difference between a time when the first external electronic device 330 outputs content and a time when the second external electronic device 340 outputs content thus causing a phenomenon of non-synchronization of content.

Figure 4:
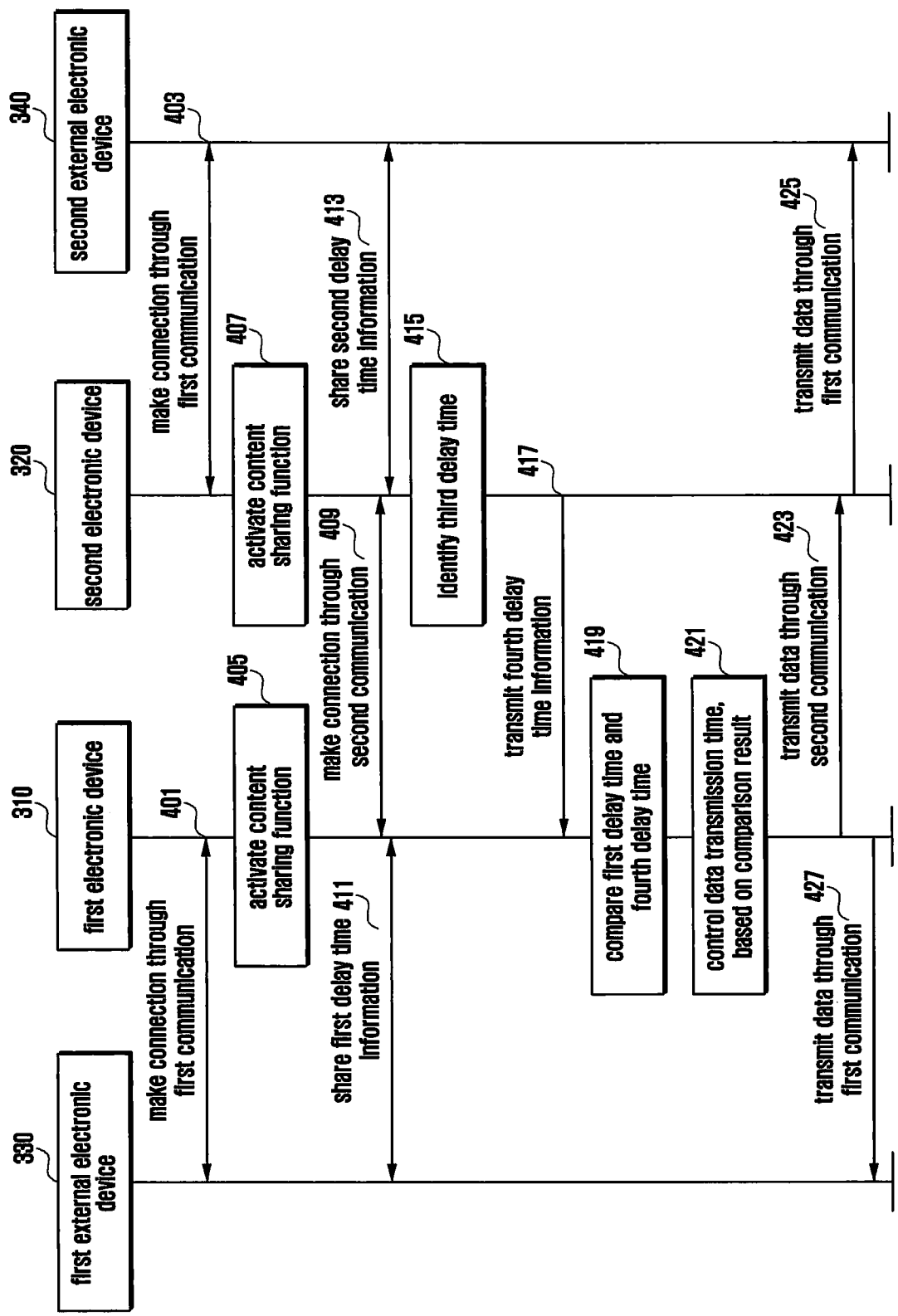
FIG. 4 illustrates operations of the first electronic device, the second electronic device, the first external electronic device, and the second external electronic device according to an embodiment.

FIG. 4 illustrates operations of the first electronic device, the second electronic device, the first external electronic device, and the second external electronic device according to an embodiment.

The first electronic device 310 and the first external electronic device 330 may establish the mutual connection therebetween through a first communication in step 401.

The first communication is different than second communication that is a communication scheme for the connection between the first electronic device 310 and the second electronic device 210 and may include short-range wireless communication. For example, the first communication may include at least one communication among Bluetooth™ or BLE.

The first external electronic device 330 may transmit a signal requesting the connection through the first communication to the first electronic device 310. The first external electronic device 330 may transmit identification information of the first external electronic device 330 and capability information of the first external electronic device 330 to the first electronic device 310 along with the connection request signal or after receiving a response signal corresponding to the connection request signal from the first electronic device 310.

The capability information of the first external electronic device 330 may include information indicating the existence or nonexistence of an element included in the first external electronic device 330, such as the display or the speaker and information on a capability of the first external electronic device 330, such as information related to a function of outputting content in the form of a sound by the first external electronic device 330 and information related to a function of outputting content in the form of a screen by the first external electronic device 330.

The second electronic device 320 and the second external electronic device 340 may establish the mutual connection therebetween through the first communication in step 403.

The second external electronic device 340 may transmit a signal requesting the connection through the first communication to the second electronic device 320. The second external electronic device 340 may transmit identification information and capability information of the second external electronic device 340 to the second electronic device 320 along with the connection request signal or after receiving a response signal corresponding to the connection request signal from the second electronic device 320.

The capability information of the second external electronic device 340 may indicate the existence or nonexistence of an element included in the second external electronic device 340, such as the display or the speaker and information on a function of the second external electronic device 340, such as information related to a function of outputting content in the form of a sound by the second external electronic device 340 and information related to a function of outputting content in the form of a screen by the second external electronic device 340.

The first electronic device 310 may activate a content sharing function in step 405.

The content sharing function may include a function of supporting an operation in which the first electronic device 310 transmits content to the second external electronic device 340 through the second electronic device 320 and/or an operation in which the first electronic device 310 transmits content to the first external electronic device 330.

The first electronic device 310 may activate the content sharing function in response to identification of satisfaction of a predetermined condition, such as a condition for connecting the first electronic device 310 and the second electronic device 320 to the same access point (AP), a condition for connecting the first electronic device 310 and the second electronic device 320 through Wi-Fi awareness-based communication or Wi-Fi direct-based communication, a condition for connecting the first electronic device 310 and the second electronic device 320 through the second communication, a condition for receiving a user input for activating the content sharing function, a condition for identifying the existence of a predetermined electronic device within a preset distance from the first electronic device 310, or a condition for receiving a signal requesting activating the content sharing function from the second electronic device 320.

The first electronic device 310 may activate a second communication circuit supporting the second communication in response to activation of the data sharing function.

The second electronic device 320 may activate the content sharing function in step 407.

The second electronic device 320 may activate the content sharing function in response to identification of satisfaction of a predetermined condition, such as a condition for receiving a user input for activating the content sharing function, a condition for identifying the existence of a predetermined electronic device within a preset distance from the second electronic device 320, or a condition for receiving a signal requesting activating the content sharing function from the first electronic device 310 by the second electronic device 320, a condition for connecting the first electronic device 310 and the second electronic device 320 to the same AP, a condition for connecting the first electronic device 310 and the second electronic device 320 through the second communication, or a condition for connecting the first electronic device 310 and the second electronic device 320 through Wi-Fi awareness-based communication or Wi-Fi direct-based communication).

The first electronic device 310 and the second electronic device 320 may establish the communication connection through the second communication in step 409.

The second communication is different than the first communication that is the communication scheme for the connection between the first electronic device 310 and the first external electronic device 330 or between the second electronic device 320 and the second external electronic device 340 and may include short-range wireless communication based on neighbor awareness networking (NAN). For example, the first communication may include Wi-Fi awareness-based communication defined in Wi-Fi or communication defined in Wi-Fi Direct.

The first electronic device 310 and the first external electronic device 330 may share first delay time information including a first delay time in step 411.

The first delay time may be a time spent for processing an operation in which the first external electronic device 330 outputs content received from the first electronic device 310. The first external electronic device 330 may identify the first delay time based on a difference value between a time when the first electronic device 310 transmits content to the first external electronic device 330 and a time when the first external electronic device 330 outputs the content.

The first external electronic device 330 may generate the first delay time information in response to reception of a signal requesting transmission of the first delay time information from the first electronic device 310. The first external electronic device 330 may identify at which a time of transmission from the first electronic device 310 included in a packet including at least some of the content transmitted by the first electronic device 310. The first external electronic device 330 may identify a time when the content received from the first electronic device 310 is output and determine the first delay time.

The first electronic device 310 may not receive the first delay time information from the first external electronic device 330. When a response signal received from the first external electronic device 330 does not include the first delay time information after the first electronic device 310 transmits the signal requesting transmission of the first delay time information, the first electronic device 310 may not receive the first delay time information. When the first electronic device 310 does not receive the first delay time information from the first external electronic device 330, the first electronic device 310 may determine the first delay time based on a strength of a response signal (ack signal) corresponding to the signal requesting transmission of the first delay time information. The delay time may increase as the strength of the response signal increases, and the first electronic device 310 may determine the first delay time based on the strength of the response signal.

When the first electronic device 310 does not receive the first delay time information from the first external electronic device 330, the first delay time may be configured as a predetermined value, which is a value preset according to a characteristic of the first external electronic device 330, such as a version of the first communication supported by the first external electronic device 330.

The first electronic device 310 and the first external electronic device 330 may |share|[RC2] the first delay time information in step 411. For example, the first external electronic device 330 may insert the first delay time information into the identification information of the first external electronic device 330 and the capability information of the first external electronic device 330, transmitted to the first electronic device 310 and transmit the identification information and the capability information. When the first external electronic device 330 transmits the capability information of the first external electronic device 330 including the first delay time information to the first electronic device 310, step 411 may be omitted.

When the first electronic device 310 does not receive the first delay time information from the first external electronic device 330, the first delay time may be configured as a predetermined value which is a value preset according to a characteristic of the first external electronic device 330, such as a version of the first communication supported by the first external electronic device 330.

The second electronic device 320 and the second external electronic device 340 may share second delay time information including a second delay time in step 413.

The second delay time may be a time spent for processing an operation in which the second external electronic device 340 outputs content received from the second electronic device 320. The second external electronic device 340 may identify the second delay time based on a difference value between a time when the second electronic device 320 transmits content to the second external electronic device 320 and a time when the second external electronic device 320 outputs the content.

The second external electronic device 340 may generate second delay time information including the second delay time in response to reception of a signal requesting transmitting the second delay time information from the second electronic device 320. The second external electronic device 340 may identify a time of transmission to the second external electronic device 340 included in a packet including at least some of the content transmitted by the second electronic device 320. The second external electronic device 340 may identify a time when the content received from the second electronic device 320 is output and determine the second delay time.

The second electronic device 320 may not receive the second delay time information from the second external electronic device 320. When a response signal received from the second external electronic device 340 does not include the second delay time information after the second electronic device 320 transmits the signal requesting transmission of the second delay time information, the second electronic device 320 may not receive the second delay time information. When the second electronic device 320 does not receive the second delay time information from the second external electronic device 340, the second electronic device 320 may determine the second delay time based on a strength of a response signal (acknowledgement (ACK) signal) corresponding to the signal requesting transmission of the second delay time information. The delay time may decrease as the strength of the response signal increases, and the second electronic device 320 may determine the second delay time based on the strength of the response signal.

The second electronic device 320 and the second external electronic device 340 may |share|[RC3] the second delay time information during operation 413. For example, the second external electronic device 340 may insert the second delay time information into the identification information of the second external electronic device 340 and the capability information of the second external electronic device 340, transmitted to the second electronic device 320 and transmit the identification information and the capability information. When the second external electronic device 340 transmits the capability information of the second external electronic device 340 including the second delay time information to the second electronic device 320, step 413 may be omitted.

When the second electronic device 320 does not receive the second delay time information from the second external electronic device 340, the second delay time may be configured as a predetermined value which is a value preset according to a characteristic of the second external electronic device 340, such as a version of the first communication supported by the second external electronic device 340.

The second electronic device 320 may identify a third delay time in step 415.

The third delay time may be related to a time spent for transmitting content to the second electronic device 320 through the second communication by the first electronic device 310. The third delay time may include a difference between a time when the first electronic device 310 starts processing for transmission of the content through the second communication, such as an operation for converting the content in the form of a packet, and a time when the second electronic device 210 receives and processes the content through the second communication. The second electronic device 320 may transmit fourth delay time information including a fourth delay time to the first electronic device 310 in step 417.

The fourth delay time may include a time spent from a time when the first electronic device 310 transmits content to the second electronic device 320 to a time when the second external electronic device 340 outputs the content. The second electronic device 320 may determine the fourth delay time based on the second delay time and the third delay time. For example, the second electronic device 320 may determine a sum of the second delay time and the third delay time as the fourth delay time.

When a response signal received from the second electronic device 320 after the first electronic device 310 transmits a signal requesting transmitting the fourth delay time information does not include the fourth delay time information, the first electronic device 310 may not receive the fourth delay time information from the second electronic device 320, in which case the first electronic device 310 may determine the fourth delay time based on a strength of a response signal (ACK signal) corresponding to the signal requesting transmission of the fourth delay time information. The delay time may decrease as the strength of the response signal increases, and the first electronic device 310 may determine the fourth delay time based on the strength of the response signal.

When the first electronic device 310 does not receive the fourth delay time information from the second electronic device 320, the fourth delay time may be configured as a predetermined value.

The first electronic device 310 may compare the first delay time and the fourth delay time in step 419.

The first delay time may include a delay time from transmission of content to the first external electronic device 330 by the first electronic device 310 to output of the content by the first external electronic device 330, and the fourth delay time may include a delay time from transmission of content to the second electronic device 320 by the first electronic device 310 to output of the content by the second external electronic device 340. A difference between the first delay time and the fourth delay time may include a difference between a time when content is output from the first external electronic device 330 and a time when content is output from the second external electronic device 340.

When the fourth delay time is longer than the first delay time, such as when the difference between the fourth delay time and the first delay time is greater than or equal to a threshold value, may include when the time at which the content is output from the first external electronic device 330 is earlier than the time at which the content is output from the second external electronic device 340 and thus the content is not synchronized.

When the first delay time is longer than the fourth delay time, such as when the difference between the fourth delay time and the first delay time is greater than or equal to a threshold value, may include when the time when the content is output from the second external electronic device 340 is earlier than the time when the content is output from the first external electronic device 330 and thus the content is not synchronized.

When the fourth delay time and the first delay time is substantially the same, such as when the difference between the fourth delay time and the first delay time is within a threshold value, may include when the time the content is output from the second external electronic device 340 is the same as the time when the content is output from the first external electronic device 330 and thus the content is synchronized.

In step 421, the first electronic device 310 may control a transmission time of data including at least some of the content to be transmitted to the first external electronic device 330 and/or the second electronic device 320 based on the result of the comparison between the first delay time and the second delay time.

The first electronic device 310 may delay transmission of the data including at least some of the content to the first external electronic device 330 in response to identifying that the fourth delay time is longer than the first delay time. After transmitting data including at least some of the content to the second electronic device 320 through the second communication, the first electronic device 310 may transmit the data including at least some of the content to the first external electronic device 330 through the first communication after a fifth delay time corresponding to the difference between the fourth delay time and the first delay time.

After transmitting the data including at least some of the content to the second electronic device 320 through the second communication, the first electronic device 310 may buffer at least some of the content for the fifth delay time and delay transmission of the data including at least some of the content to the first external electronic device 330 by temporarily storing the content in a buffer. For example, the buffer may be implemented in a communication circuit 190, a processor 120, or another element, such as the memory 130.

The first electronic device 310 may transmit dummy data to the first external electronic device 330 through the first communication while at least some of the content is buffered. For example, the dummy data may be for maintaining a mode in which transmission of content is in standby when the first external electronic device 330 cannot receive the content from the first electronic device 310. When the first external electronic device 330 cannot receive content for at least a predetermined time, the first external electronic device may switch to an idle mode from the mode in which transmission of the content is in standby in order to reduce power consumption. The first external electronic device 330 may stand by transmission of the content without switching to the idle mode according to reception of dummy data from the first electronic device 310. The dummy data may be data including no content, such as silent data.

The first electronic device 310 may delay transmission of the data including at least some of the content to the second electronic device 320 in response to identifying that the first delay time is longer than the fourth delay time. The first electronic device 310 may transmit the data including at least some of the content to the second electronic device 320 through the second communication after the fifth delay time corresponding to the difference between the fourth delay time and the first delay time transmitting the content to the first external electronic device 330 through the first communication.

The first electronic device 310 may transmit a signal requesting delaying transmission of the data including at least some of the content to the second external electronic device 340 by the second electronic device 320 to the second electronic device 320 along with the content in response to identifying that the first delay time is longer than the fourth delay time. For example, the signal requesting delayed transmission of the data including at least some of the content may include the fifth delay time corresponding to the difference between the first delay time and the fourth delay time.

After receiving the data including at least some of the content from the first electronic device 310 through the second communication, the second electronic device 320 may buffer at least some of the content for the fifth delay time and delay transmission of the content to the second external electronic device 340. The second electronic device 320 may buffer at least some of the content by temporarily storing the content in a buffer. For example, the buffer may be implemented in a communication circuit 190, a processor 120, or the memory 130.

The second electronic device 320 may transmit dummy data to the second external electronic device 340 through the first communication while at least some of the content is buffered. For example, the dummy data may be for maintaining a mode in which transmission of content is in standby when the second external electronic device 340 cannot receive the content from the second electronic device 320. When the second external electronic device 340 cannot receive content for a predetermined time or longer, the second external electronic device may switch to an idle mode from the mode in which transmission of the content is in standby in order to reduce power consumption. The second external electronic device 340 may stand by transmission of the content without switching to the idle mode according to reception of dummy data from the second electronic device 320. The dummy data may include no content, such as silent data.

In step 423, the first electronic device 310 may transmit the data including at least some of the content to the second electronic device 320 through the second communication.

In step 425, the second electronic device 320 may transmit the data including at least some of the content to the second external electronic device 340 through the first communication.

In step 427, the first electronic device 310 may transmit the data including at least some of the content to the first external electronic device 330 through the first communication.

The order of steps 423, 425, and/or 427 may be changed based on the fifth delay time corresponding to the difference between the first delay time and the fourth delay time.

The first electronic device 310 may perform step 423 earlier than step 427 in response to identifying that the fourth delay time is longer than the first delay time. The first electronic device 310 may perform step 423 and then step 427 after the fifth delay time.

The first electronic device 310 may perform step 427 earlier than step 423 in response to identifying that the first delay time is longer than the fourth delay time. The first electronic device 310 may perform step 427 and then step 423 after the fifth delay time.

As described above, the first electronic device 310 may control the time when the content is transmitted to the second electronic device 320 and/or the first external electronic device 330 based on the result of comparison between the first delay time and the fourth delay time, so as to match the content output time of the second external electronic device 340 and the content output time of the first external electronic device 330 and implement synchronization of the content output time.

Figure 5:
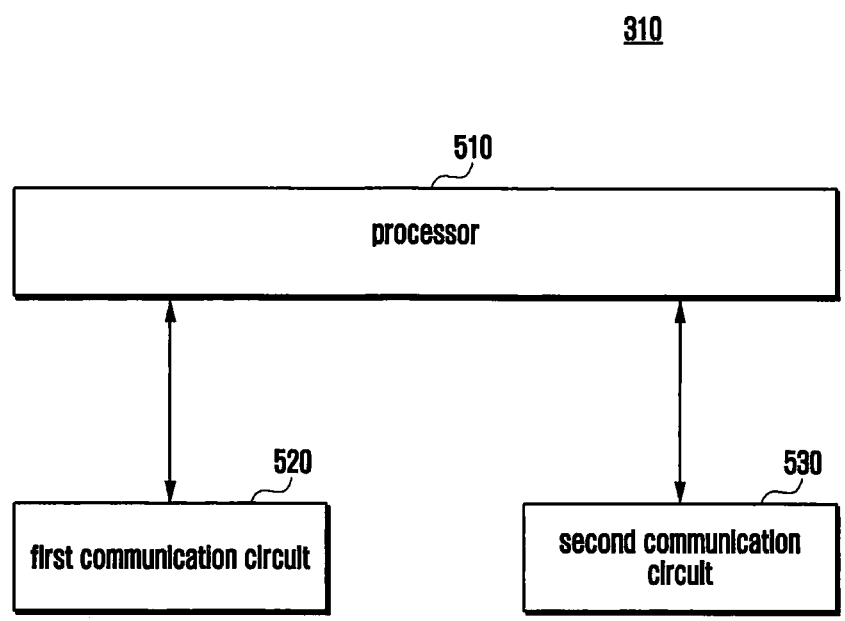
FIG. 5 is a block diagram illustrating the first electronic device according to an embodiment.

FIG. 5 is a block diagram illustrating a first electronic device according to an embodiment.

Referring to FIG. 5, a first electronic device may include a processor 510, a first communication circuit 520, and a second communication circuit 530.

The first communication circuit 510 supports first communication and may be an element implemented in hardware or software. The first communication is different than second communication that is a communication scheme for the connection between the first electronic device 310 and the second electronic device and may include short-range wireless communication, such as at least one communication among Bluetooth™ or BLE.

The second communication circuit 530 supports second communication and may be an element implemented in hardware or software. The second communication is different than the first communication that is a communication scheme for the connection between the first electronic device 310 and the first external electronic device and may include short-range wireless communication based on NAN. For example, the second communication may include Wi-Fi awareness-based communication defined in Wi-Fi or communication defined in Wi-Fi direct.

The first communication and the second communication may be various short-range wireless communication schemes such as Bluetooth™, BLE, Wi-Fi awareness-based communication, and/or communication defined in Wi-Fi direct. Alternatively, the first communication and the second communication may be the same short-range wireless communication.

The first communication circuit 520 and the second communication circuit 530 may be elements included in one packaged communication module or may be elements included in different packaged chips.

The processor 510 may be operatively or electrically connected to the first communication circuit 520 and the second communication circuit 530 to control the first communication circuit 520 and the second communication circuit 530.

The processor 510 may control the first communication circuit 520 to transmit or receive data to or from the first external electronic device 330 through the first communication. The processor 510 may control the second communication circuit 530 to transmit or receive data to or from the second electronic device 320 through the second communication. Data exchanged through the first communication and/or the second communication may include at least some of the content.

The processor 510 may activate a content sharing function in response to identification of satisfaction of a predetermined condition, such as various conditions including a condition for connecting the first electronic device 310 and the second electronic device 320 to the same AP, a condition for receiving a user input for activating the content sharing function, a condition for identifying the existence of a predetermined electronic device, such as the second electronic device 320 being within a preset distance from the first electronic device 310, or a condition for receiving a signal requesting activating the content sharing function from the second electronic device 320.

The content sharing function may include a function of supporting an operation in which the first electronic device 310 transmits content to the second external electronic device 340 through the second electronic device 320 and/or an operation in which the first electronic device 310 transmits content to the first external electronic device 330.

The processor 510 may activate the second communication circuit 530 supporting the second communication in response to activation of the data sharing function. The processor 510 may control the second communication circuit 530 to make the connection with the second electronic device 320 through the second communication.

The processor 510 may control the first communication circuit 520 to transmit content to the first external electronic device 330 through the first communication and control the second communication circuit 520 to transmit content to the second electronic device 320 through the second communication. The second electronic device 320 receiving the content may transmit the content to the second external electronic device 340 through the first communication.

The processor 510 may control the first communication circuit 520 to transmit a signal requesting transmitting first time information, such as the first delay time information of FIG. 4, including a first time, such as the first delay time of FIG. 4, to the first external electronic device 330 through the first communication. The processor 510 may control the first communication circuit 520 to transmit the signal requesting transmission of the first time information to the first external electronic device 330 at every predetermined time. Alternatively, when the first external electronic device 330 can transmit the first time information regardless of reception of the signal requesting transmission of the first time information, the processor 510 may receive the first time information from the first external electronic device 330 without performing the operation of transmitting the signal requesting transmission of the first time information. The processor 510 may receive the first time information while the connection with the first external electronic device 330 through the first communication is made.

The first time may be a time spent for processing the operation of outputting the content received from the first electronic device 310 by the first external electronic device 330. The first external electronic device 330 may identify the first time based on a difference between a time when the first electronic device 310 transmits the data including at least some of the content to the first external electronic device 330 and a time when the first external electronic device 330 outputs the content. The first external electronic device 330 may generate the first time information in response to reception of the signal requesting transmission of the first time information by the first electronic device 310. The first external electronic device 330 may identify a time of transmission from the first external electronic device 330, included in the data including at least some of the content transmitted from the first electronic device 310. The first external electronic device 330 may identify a time when the content is output and determine the first time.

The first electronic device 310 may transmit the signal requesting transmission of the first time information to the first external electronic device 330 whenever the first time is changed. For example, the first external electronic device 330 may periodically or intermittently identify a change in the first time and, when the first time is changed by a predetermined range or more, transmit the first time information to the first electronic device 310.

The processor 510 may identify the first time.

When a response signal received from the first external electronic device 330 does not include the first time information after the first electronic device 310 transmits the signal requesting transmission of the first time information, the processor 510 may not receive the first time information. When the first time information is not received from the first external electronic device 330, the first electronic device 310 may determine the first time based on the strength of a response signal (ACK signal) corresponding to the signal requesting transmission of the first time information. As the strength of the response signal increases, the delay time may be further reduced, and the processor 510 may determine a first delay time based on the strength of the response signal.

When the first time information is not received from the first external electronic device 330, the processor 510 may configure the first time as a predetermined value which is a value preset according to a characteristic of the first external electronic device 330, such as a version of the first communication supported by the first external electronic device 330.

The processor 510 may control the second communication circuit 530 to transmit a signal requesting second time information, such as the fourth delay time information of FIG. 4, including a second time, such as the fourth delay time of FIG. 4, to the second electronic device 320 through the second communication.

The second time may include a time spent from a time when the first electronic device 310 transmits the content to the second electronic device 320 to a time when the second external electronic device 340 outputs the content. The second electronic device 320 may determine the second time based on a second delay time and a third delay time. For example, the second electronic device 320 may determine a sum of the second delay time and the third delay time as the second time.

The processor 510 may not receive the second time information from the second electronic device 320. When a response signal received from the second electronic device 320 after the first electronic device 310 transmits the signal requesting transmission of the second time information does not include the second time information, the first electronic device 310 may not receive the second time information. When the first electronic device 310 does not receive the second time information, the first electronic device 310 may determine the second time based on the strength of a response signal (ack signal) corresponding to the signal requesting transmission of the second time information. As the strength of the response signal increases, the delay time may be further reduced, and the first electronic device 310 may determine the second time based on the strength of the response signal.

When the first electronic device 310 does not receive the second time information from the second electronic device 320, the first electronic device 310 may configure the second time as a predetermined value.

The processor 510 may compare the first time and the second time. A difference between the first time and the second time may include a difference between a time when the content is output from the first external electronic device 330 and a time when the content is output from the second external electronic device 340.

When the second time is longer than the first time, such as when the difference between the second time and the first time is greater than or equal to a threshold value) may include the state in which the time when the content is output from the first external electronic device 330 is earlier than the time when the content is output from the second external electronic device 340 and thus the content is not synchronized.

When the first time is longer than the second time, such as when the difference between the second time and the first time is greater than or equal to a threshold value, may include the state in which the time when the content is output from the second external electronic device 330 is earlier than the time when the content is output from the first external electronic device 340 and thus the content is not synchronized.

The processor 510 may control the time when the content is transmitted to the first external electronic device 330 and/or the second electronic device 320 based on the result of comparison between the first time and the second time.

The processor 510 may delay transmission of the data including at least some of the content to the first external electronic device 330 in response to identifying that the second time is longer than the first time. The first electronic device 310 may transmit the content to the first external electronic device 330 through the first communication after a third time, such as the fifth delay time of FIG. 4, corresponding to the difference between the second time and the first time from transmission of the content to the second electronic device 320 through the second communication.

After transmitting the data including at least some of the content to the second electronic device 320 through the second communication, the processor 510 may buffer at least some of the content for the third time and delay transmission of the data including at least some of the content to the first external electronic device 330. The first electronic device 310 may buffer the content by temporarily storing at least some of the content in a buffer. The buffer may be implemented in the first communication circuit 520, the processor 510, or the memory 130.

The first electronic device 310 may transmit dummy data to the first external electronic device 330 through the first communication while at least some of the content is buffered. For example, the dummy data may be for maintaining a mode in which transmission of the content is in standby when the first external electronic device 330 cannot receive the content. When the first external electronic device 330 cannot receive the content from the first electronic device 310 for a predetermined time or longer, the first external electronic device 330 may switch to an idle mode from the mode in which transmission of the content is in standby in order to reduce power consumption. The first external electronic device 330 may stand by transmission of the content without switching to the idle mode according to reception of the dummy mode. The dummy data may include no content, for example, silent data. The first external electronic device 330 may output the dummy data, so as to prevent output of noise.

The first external electronic device 330 may store in advance the dummy data. In this case, the first electronic device 310 may control the first external electronic device 330 to output the dummy data while the content is buffered. For example, the first electronic device 310 may make a request for outputting the dummy data to the first external electronic device 330.

The first electronic device 310 may delay transmission of the data including at least some of the content to the second electronic device 320 in response to identifying that the first time is longer than the second time. The first electronic device 310 may transmit the data including at least some of the content to the second electronic device 320 through the second communication after the third time from transmission of the data including at least some of the content to the first external electronic device 330 through the first communication.

The first electronic device 310 may transmit a signal requesting delaying transmission of the data including at least some of the content from the second electronic device 320 to the second external electronic device 340 along with the content in response to identifying that the first time is longer than the second time. The signal requesting delayed transmission of the data including at least some of the content may include the third time.

After receiving the data including at least some of the content from the first electronic device 310 through the second communication, the second electronic device 320 may buffer the content for the third time and delay transmission of the data including at least some of the content to the second external electronic device 340. The second electronic device 320 may buffer the content by temporarily storing the content in a buffer. The buffer may be implemented in the second communication circuit 530, the processor 510, or the memory 130.

The second electronic device 320 may transmit dummy data to the second external electronic device 340 through the first communication while the content is buffered. The dummy data may be data for maintaining a mode in which transmission of the content is in standby when the second external electronic device 340 cannot receive the content from the second electronic device 320. When the second external electronic device 340 cannot receive content for a predetermined time or longer, the second external electronic device may switch to an idle mode from the mode in which transmission of the content is in standby in order to reduce power consumption. The second external electronic device 340 may stand by transmission of the content without switching to the idle mode according to reception of the dummy mode. The dummy data may include no content, such as silent data. The second external electronic device 340 may output the dummy data, so as to prevent output of noise.

As described above, the first electronic device 310 may control the time when the content is transmitted to the second electronic device 320 and/or the first external electronic device 330 based on the result of comparison between the first time and the second time, so as to match the content output time of the second external electronic device 340 and the content output time of the first external electronic device 330 and implement synchronization of the content output time.

The first electronic device 310 may control a time when content displayed on a display of the first electronic device 310 starts being displayed based on the first time and the second time, thereby implementing synchronization of the content display time.

The processor 510 may delay the operation of displaying the content based on a larger value between the first time and the second time and a time spent for processing voice data of the content by at least one of the first electronic device 310 and the second electronic device 320.

The processor 510 may delay the operation of displaying the content by a sum of the second time and the time spent for processing voice data by the second electronic device 320 in response to identifying that the second time is longer than the first time.

The processor 510 may delay the operation of displaying the content by a sum of the first time and the time spent for processing voice data in response to identifying that the first time is longer than the second time. An embodiment related to delay of the operation of displaying the content is described below with reference to FIGS. 10A, 10B, 11A, and 11B.

The processor 510 may receive a user input for controlling reproduction of the content and control reproduction of the content. The processor 510 may generate a control signal corresponding to the user input and transmit the control signal to the first external electronic device 330 and/or the second electronic device 320. For example, the processor 510 may receive a user input for controlling a volume related to reproduction of the content through the display 160 or a separate physical button. The processor 510 may generate a control signal for controlling a volume and transmit the same to the first external electronic device 330 and/or the second electronic device 320. The first external electronic device 330 and/or the second electronic device 320 may control output of the content in response to reception of the control signal. The first external electronic device 330 and/or the second electronic device 320 may transmit a control result or state information related to reproduction of the content based on the control signal to the first electronic device 310. The processor 510 may receive the control result and output the control result on the display 160.

Although FIG. 5 illustrates that the number of second electronic devices 320 receiving the content from the first electronic device 310 and transmitting the received content to the second external electronic device 340 is one, the number of second electronic device 320 may be plural, in which case the first electronic device 310 may control a time when the content is transmitted to the first external electronic device 330 in consideration of all of second times at which a plurality of second electronic devices 320 transmit content.

Figure 6:
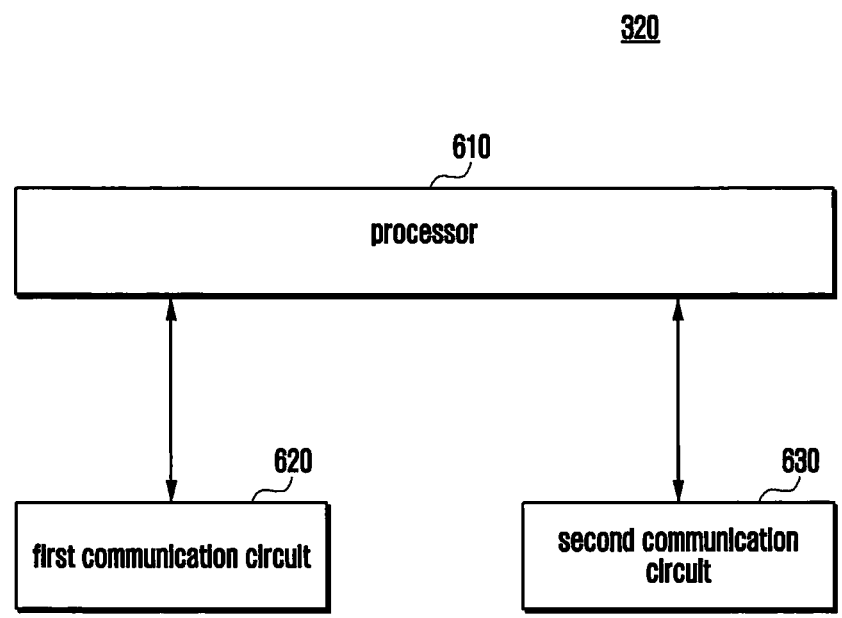
FIG. 6 is a block diagram illustrating the second electronic device according to an embodiment.

FIG. 6 is a block diagram illustrating a second electronic device according to an embodiment.

Referring to FIG. 6, a second electronic device 320 may include a processor 610, a first communication circuit 620, and/or a second communication circuit 630.

The first communication circuit 620 supports first communication and may be an element implemented in hardware or software. The first communication is different than second communication that is a communication scheme for the connection between a first electronic device and a second electronic device and may include short-range wireless communication such as Bluetooth™ or BLE.

The second communication circuit 630 supports second communication and may be an element implemented in hardware or software. The second communication is different than the first communication that is a communication scheme for the connection between the first electronic device 310 and the first external electronic device and may include short-range wireless communication based on NAN. For example, the second communication may include Wi-Fi awareness-based communication defined in Wi-Fi or communication defined in Wi-Fi Direct.

The first communication and the second communication may be the same short-range wireless communication such as Bluetooth™, BLE, Wi-Fi awareness-based communication, or communication defined in Wi-Fi direct.

The first communication circuit 620 and the second communication circuit 630 may be elements included in one packaged communication module or may be elements included in different packaged chips.

The processor 610 may be operatively or electrically connected to the first communication circuit 620 and the second communication circuit 630 to control the first communication circuit 620 and the second communication circuit 630.

The processor 610 may control the first communication circuit 620 to transmit or receive data (or content) to or from the second external electronic device 340 through the first communication. The processor 610 may control the second communication circuit 630 to transmit or receive data (or content) to or from the first electronic device 310 through the second communication.

The processor 610 may activate the content sharing function in response to identification of satisfaction of a predetermined condition, such as a condition for receiving a user input for activating the content sharing function, a condition for identifying the existence of a predetermined electronic device within a preset distance from the second electronic device 320 or a condition for receiving a signal requesting activating the content sharing function from the first electronic device 310.

The content sharing function may include a function of supporting an operation in which the first electronic device 310 transmits content to the second external electronic device 340 through the second electronic device 320 and/or an operation in which the first electronic device 310 transmits content to the first external electronic device 330.

The processor 610 may activate the second communication circuit 630 supporting the second communication in response to activation of the data sharing function. The processor 610 may control the second communication circuit 630 to make the connection with the first electronic device 310 through the second communication.

The processor 610 may control the second communication module 630 to transmit the content received from the first electronic device 310 through the second communication to the second external electronic device 340 through the first communication.

The processor 610 may receive a signal requesting second time information from the first electronic device 310.

The second time may include a time spent from a time when the first electronic device 310 transmits content to the second electronic device 320 to a time when the second external electronic device 340 outputs the content.

The processor 610 may transmit a signal requesting second delay time information to the second external electronic device 340 and receive the second delay time information from the second external electronic device 340 in response to reception of the signal requesting the second time information. The second delay time may include a time spent for processing the operation in which the second external electronic device 340 receives the content from the second electronic device 320 and outputs the content. Alternatively, when the second external electronic device 340 can transmit the second delay time information regardless of reception of the signal requesting transmission of the second delay time information, the processor 610 may receive the second delay time information from the second external electronic device 340 without performing the operation of transmitting the signal requesting transmission of the second delay time information. The processor 610 may receive the second delay time information while the connection with the second external electronic device 340 through the first communication is made.

The processor 610 may identify a third delay time in response to reception of the signal requesting the second time information. The third delay time may be related to the time spent for transmission of the content through the second communication. The third delay time may include a difference between a time when the first electronic device 310 starts processing for transmission of the content through the second communication, such as operation for converting the content in the form of a packet, and a time when the second electronic device 320 receives and processes the content through the second communication.

The processor 610 may identify the second time based on the second delay time and the third delay time. The second time is a time spent from a time when the first electronic device 310 transmits data including at least some of the content to the second electronic device 320 to a time when the second external electronic device 340 outputs the content and may be acquired by the processor 610 based on a sum of the second delay time and the third delay time.

The processor 610 may identify the second time information and transmit the second time information to the first electronic device 310 through the first communication.

The first electronic device 310 may control a time when the content is transmitted based on the result of comparison between the first time and the second time. The first electronic device 310 may transmit control information related to the time when the content is transmitted to the second electronic device 320 through the second communication.

The first electronic device 310 may transmit, to the second electronic device 320, a signal requesting delaying transmission of the data including at least some of the content from the second electronic device 320 to the second external electronic device 340 along with the content in response to identifying that the first time is longer than the second time. The signal requesting delayed transmission of the data including at least some of the content may include a third time corresponding to a difference between the first time and the second time.

After receiving the data including at least some of the content from the first electronic device 310 through the second communication, the processor 610 may buffer the content for the third time and delay transmission of the content to the second external electronic device 340. The processor 610 may buffer the content by temporarily storing the content in a buffer. The buffer may be implemented in the processor 610, the first communication module 620, or the memory, such as the memory 130.

The processor 610 may transmit dummy data to the second external electronic device 340 through the first communication while the content is buffered. For example, the dummy data may be for maintaining a mode n which transmission of the content is in standby when the second external electronic device 340 cannot receive the content. When the second external electronic device 340 cannot receive the content from the second electronic device 320 for a predetermined time or longer, the second external electronic device 340 may switch to an idle mode from the mode in which transmission of the content is in standby in order to reduce power consumption. The second external electronic device 340 may stand by transmission of the content without switching to the idle mode according to reception of the dummy mode. The dummy data may include no content, such as silent data. The second external electronic device 340 may output the dummy data, so as to prevent output of noise.

The second external electronic device 340 may store in advance the dummy data. In this case, the processor 610 may control the second external electronic device 340 to output the dummy data while the content is buffered. For example, the second electronic device 330 may make a request for outputting the dummy data to the second external electronic device 340.

Figure 7:
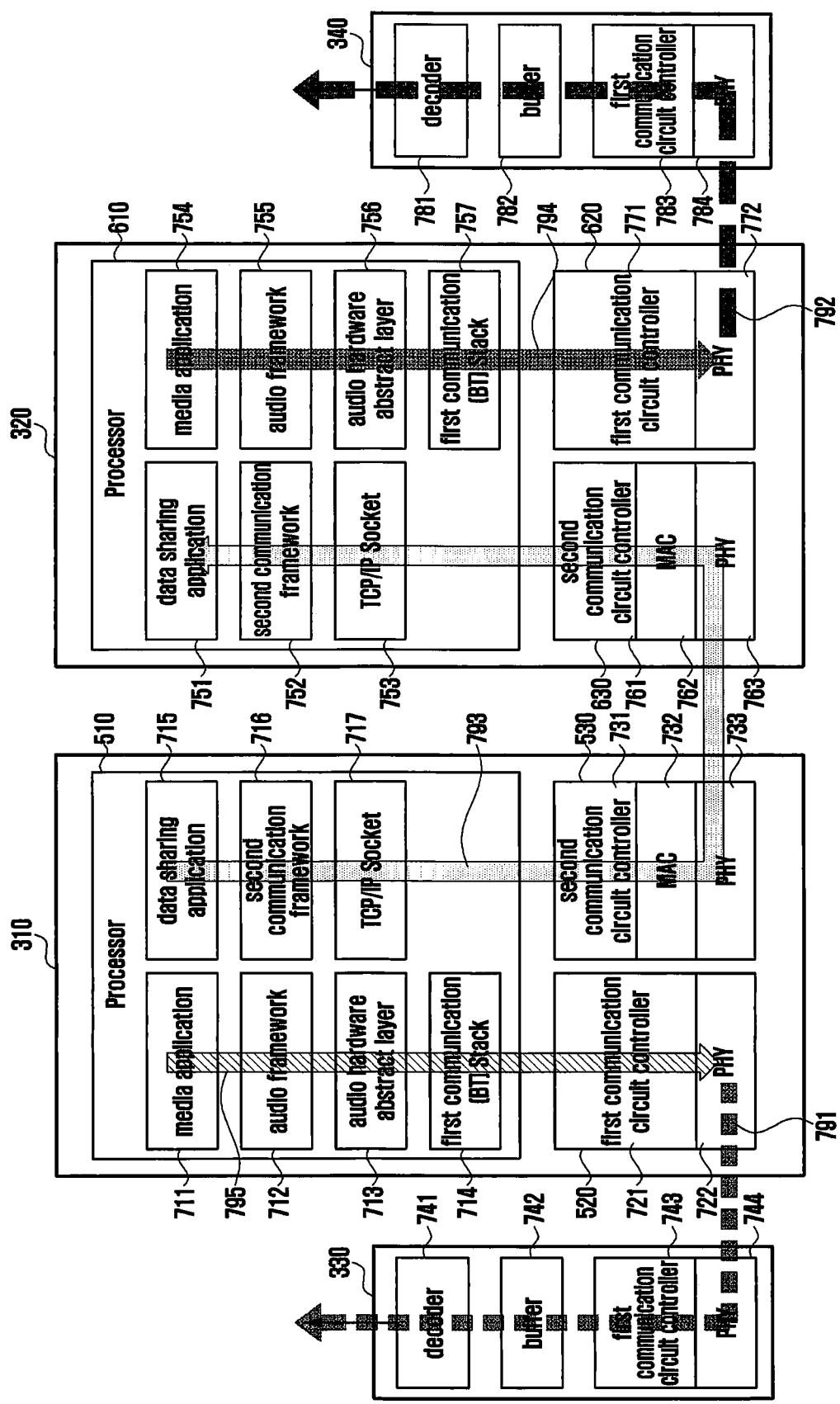
FIG. 7 illustrates transmission and reception of content by the first electronic device, the second electronic device, the first external electronic device, and the second external electronic device according to an embodiment.

FIG. 7 illustrates transmission and reception of content by the first electronic device, the second electronic device, the first external electronic device, and the second external electronic device according to an embodiment.

The first electronic device 310 may include a processor 510, a first communication circuit 520, and a second communication circuit 530. The second electronic device 320 may include a processor, a first communication circuit 620, and a second communication circuit 630.

The processor 510 or 610 of the electronic device may include a media application 711 or 754 for performing processing reproduction of various contents, an audio framework 712 or 755 for encoding or decoding a media file corresponding to content, an audio hardware abstract layer 713 or 756 for managing an abstract layer between audio hardware and software, a first communication stack 714 or 757 for controlling an element for performing a function related to the first communication, a data sharing application 715 or 751 for sharing data (or content), a second communication framework 716 or 752 for controlling an element for performing a function related to the second communication, and a transmission control protocol IP (TCP/IP) socket 717 or 753 for managing data transmission and reception using an IP (converting data including at least some of the content to IP data or extracting data included in IP data). The above elements may be implemented in hardware or software, and some elements may be omitted.

The first communication circuit 520 or 620 of the electronic device may include a first communication circuit controller 721 or 771 for controlling a function related to the first communication and a PHY layer 722 or 772 for performing various operations, such as encoding, modulation, or resource allocation) for transmitting data transmitted by the first communication circuit controller 721 or 771 through the first communication.

The second communication circuit 530 or 630 may include a second communication circuit controller 731 or 761 for controlling a function related to the first communication, a MAC layer 732 or 762 for checking an error of data received by a PHY layer 733 or 763 or converting data transmitted by a higher layer into a format for transmission, and the PHY layer 733 or 763 for performing various operations, such as encoding, modulation, or resource allocation) for transmitting data transmitted by the MAC layer 732 or 762 to an external electronic device connected through the second communication.

The first external electronic device 330 may include a decoder 741 for decoding encoded data received through the first communication, a buffer 742 for temporarily storing data including at least some of the content received through the first communication, a first communication circuit controller 743 for controlling a function related to the first communication, and a PHY layer 744 for performing various operations, such as demodulation or resource allocation for receiving data received through the first communication. The second external electronic device 340 may include a decoder 781 for decoding encoded data received through the first communication, a buffer 782 for temporarily storing data including at least some of the content received through the first communication, a first communication circuit controller 783 for controlling a function related to the first communication, and a PHY layer 784 for performing various operations, such as demodulation or resource allocation for receiving data received through the first communication.

The first electronic device 310 may activate the content sharing function and transmit data including at least some of the content to be shared to the first external electronic device 330 through the first communication, such as the first communication circuit 520, or to the second electronic device 320 through the second communication, such as the second communication circuit 530. The second electronic device 320 may transmit data including at least some of the content received through the second to the second external electronic device 340 through the first communication.

A first delay time 791 may include a delay time from a time when the first electronic device 310 transmits data including at least some of the content to the first external electronic device 330 to a time when the first external electronic device 330 outputs the content. Referring to FIG. 7, a sum of the time when the content is transmitted to the first external electronic device 330 through the first communication circuit 520 and the time when the content is output through elements, such as the PHY 744, the first communication circuit controller 743, the buffer 742, and/or the decoder 741 of the first external electronic device 330 may be the first delay time 791. The first delay time 791 may vary depending on a quality of a communication channel between the first electronic device 310 and the first external electronic device 330. According to an embodiment, as the quality of the communication channel between the first electronic device 310 and the first external electronic device 330 is reduced, the first delay time 791 may increase.

A second delay time 792 may be from a time when the second electronic device 320 transmits data including at least some of the content to the second external electronic device 340 to a time when the second external electronic device 340 outputs the content. Referring to FIG. 7, a sum of the time when the content is transmitted to the second external electronic device 340 through the first communication circuit 620 and the time when the content is output through elements, such as the PHY 784, the first communication circuit controller 783, the buffer 782, and/or the decoder 781 of the second external electronic device 330 may be the second delay time 792. The second delay time 792 may vary depending on a quality of a communication channel between the second electronic device 320 and the second external electronic device 340. As the quality of the communication channel between the second electronic device 320 and the second external electronic device 340 is reduced, the second delay time 792 may increase.

A third delay time 793 may be related to a time spent for transmission of data including at least some of the content from the first electronic device 310 to the second electronic device 320 through the second communication. The third delay time 793 may include a difference between a time when the first electronic device 310 starts processing (operation of converting the content into a packet form) for transmission of data including at least some of the content through the second communication, such as a communication scheme supported by the second communication circuit 530, and a time when the second electronic device 320 receives the content through the second communication, such as a communication scheme supported by the second communication circuit 530, and processes the same.

Referring to FIG. 7, a time spent when the content is transmitted to the second electronic device 320 via elements of the first electronic device 310 and the content received by the second electronic device 320 arrives at the second electronic device 320 via elements of the second electronic device 320 may be the third delay time 793. The third delay time 793 may vary depending on a quality of a communication channel between the first electronic device 310 and the second electronic device 320. As the quality of the communication channel between the first electronic device 310 and the second electronic device 320 is reduced, the third delay time 793 may increase.

A fourth delay time may include a time spent from a time when the first electronic device 310 transmits data including at least some of the content to the second electronic device 320 to a time when the second external electronic device 340 outputs the content. The fourth delay time may be determined by a sum of the third delay time 793, a time 794 for which the second electronic device 320 processes transmission of the content to the second external electronic device 340, and the second delay time 792. The time 794 for which processing for transmission of the content to the second external electronic device 340 is performed is a time for which the content is transmitted to the second external electronic device 340 through elements of the second external electronic device 340 and may be defined as a sixth delay time.

The sixth delay time may be a time 795 for which the first electronic device 310 performs processing for transmission of the content to the first external electronic device 330. For example, the sixth delay time may be a time for which the content is transmitted to the first external electronic device 330 through elements of the first electronic device 310.

Figure 8A:
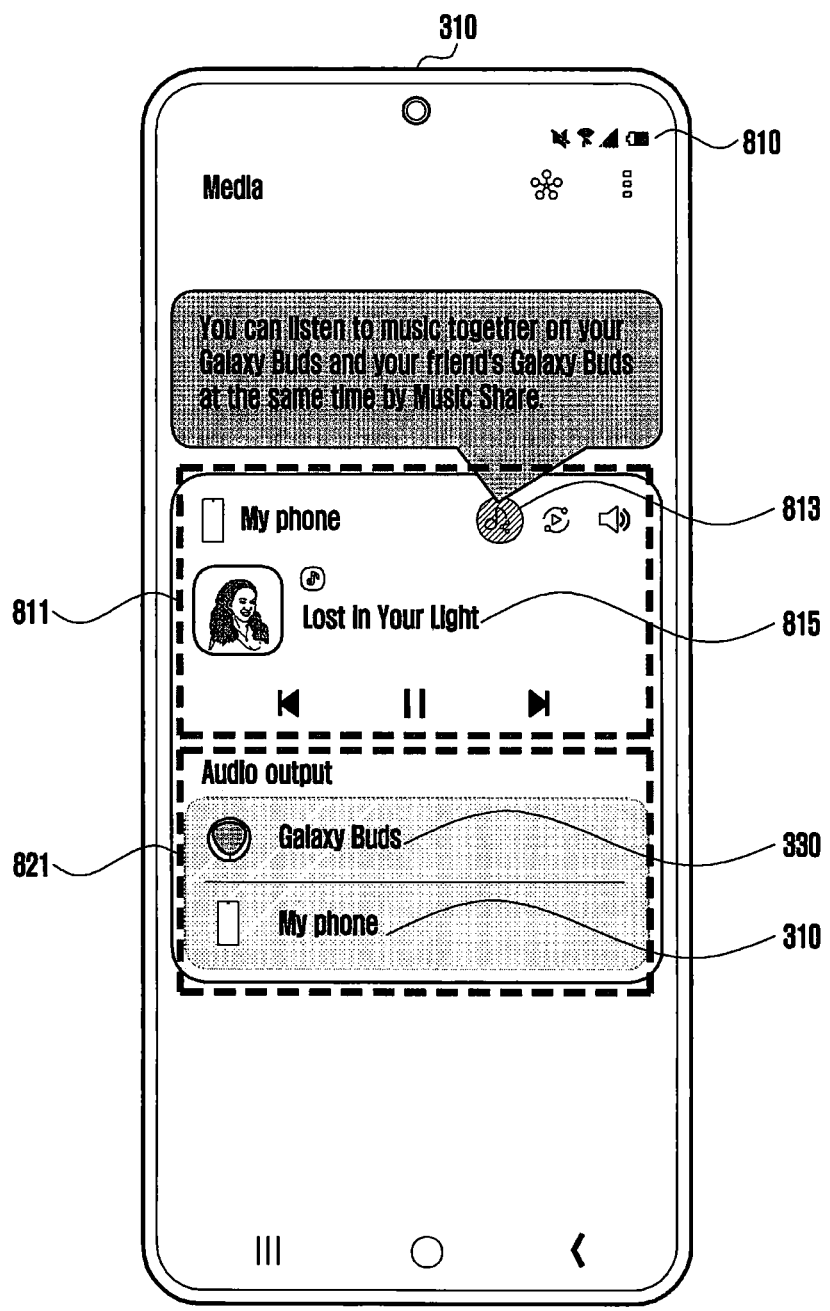
FIG. 8A illustrates a screen displayed on a display of the first electronic device according to a first embodiment.
Figure 8B:
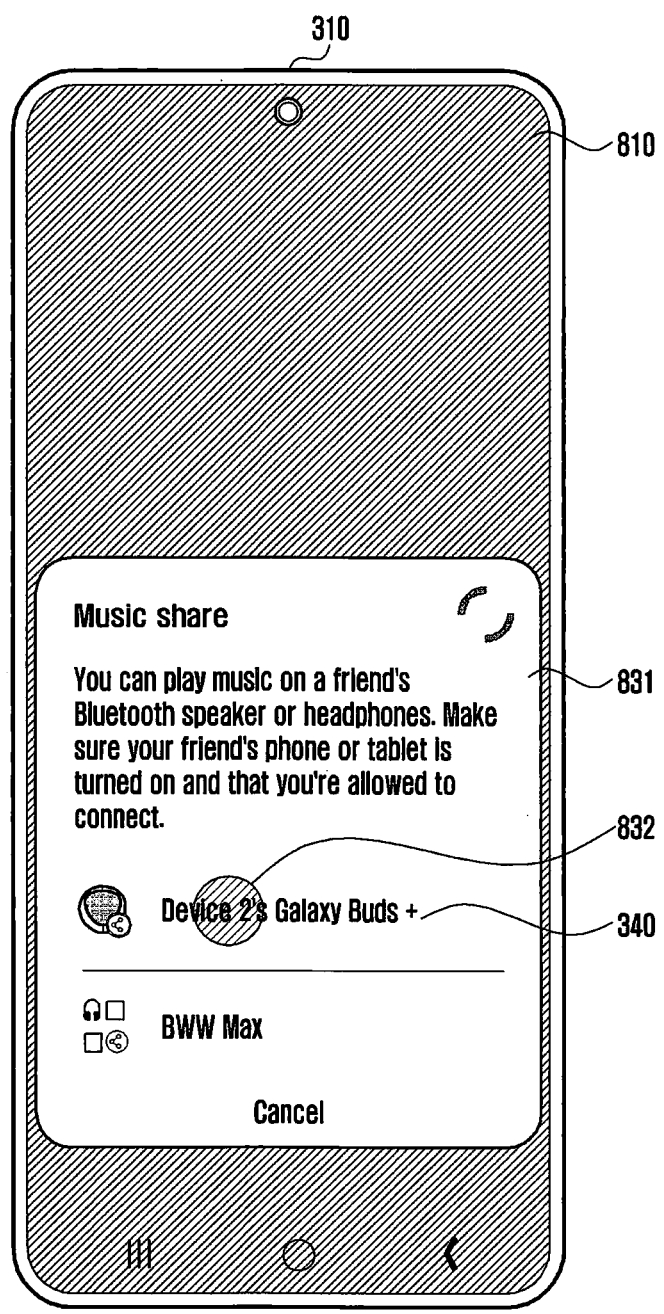
FIG. 8B illustrates a screen displayed on a display of the first electronic device according to a second embodiment.
Figure 8C:
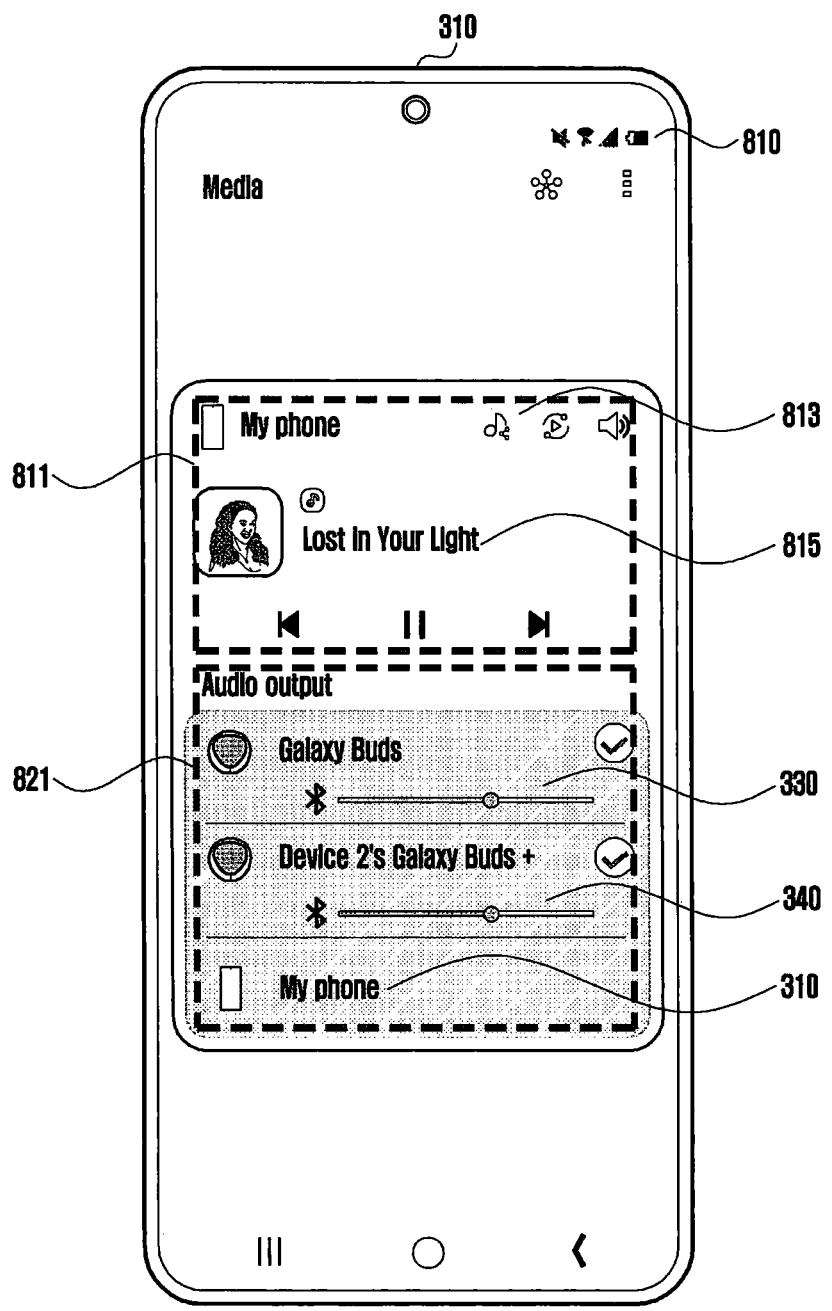
FIG. 8C illustrates a screen displayed on a display of the first electronic device according to a third embodiment.

FIG. 8A illustrates a screen displayed on a display of a first electronic device according to a first embodiment, FIG. 8B illustrates a screen displayed on a display of a first electronic device according to a second embodiment, and FIG. 8C illustrates a screen displayed on a display of a first electronic device according to a third embodiment.

Referring to FIG. 8A, a first electronic device may output a screen 810 related to output of content on a display.

The screen 810 related to output of the content may include a first area 811 for controlling reproduction of the content and a second area 821 for selecting and controlling an electronic device to reproduce the content.

The first area 811 may include an area 815 for controlling reproduction of the content and an area 813 for receiving an input for activating the content sharing function. The area 815 for controlling reproduction of the content may be an area for receiving a user input of performing various functions including starting, stopping, or ending reproduction of the content and may include information on the reproduced content, such as a thumbnail image, a name of the content, and a type of the content (video content or voice content.

The second area 821 is for selecting an electronic device to reproduce the content and may include a list of electronic devices capable of reproducing the content. Referring to FIG. 8A, the second area 821 may include an icon corresponding to the first electronic device 310 and an icon corresponding to the first external electronic device 330 connected with the first electronic device 310 through the first communication. The first electronic device 310 may transmit the content to the selected electronic device in response to reception of the user input of selecting the electronic device capable of reproducing the content.

The first electronic device 310 may receive a user input of selecting the area 815 for controlling reproduction of the content and the area 813 for receiving the input of activating the content sharing function, included in the first area 811.

The content sharing function may include a function of supporting an operation in which the first electronic device 310 transmits content to the second external electronic device 340 through the second electronic device 320 and/or an operation in which the first electronic device 310 transmits content to the first external electronic device 330.

The first electronic device 310 may activate the second communication circuit 530 supporting the second communication in response to activation of the data sharing function. The first electronic device 310 may control the second communication circuit 530 to make the connection with the second electronic device 320 through the second communication. For example, the first electronic device 310 may search for an electronic device having a connection history through the second communication or search for another electronic device supporting the second communication. The first electronic device 310 may receive information, such as capability information of the second external electronic device 340 and identification information of the second external electronic device 340, on the electronic device connected with the second electronic device 320 through the first communication from the second electronic device 320 through the second communication circuit 530.

Referring to FIG. 8B, the first electronic device may output a screen |831|[RC4] for selecting the electronic device to output the content on a display in response to activation of the content sharing function. For example, the screen 831 for selecting the electronic device may be displayed while being overlaid on the screen 810 related to output of the content.

The screen 831 for selecting the electronic device may include a list of targets to share the content in order to select the targets to share the content. Referring to FIG. 8B, the screen 831 for selecting the electronic device may include information on the second external electronic device 340.

The first electronic device 310 may transmit the content to the second electronic device 320 through the second communication in response to reception of a user input 832 of selecting the second external electronic device 340. The second electronic device 320 may transmit the received content to the second external electronic device 340 through the first communication.

Referring to FIG. 8C, The first electronic device 310 may display the screen 810 related to output of the content, including the first area 811 for controlling reproduction of the content and the second area 821 for selecting and controlling the electronic device to reproduce the content on the display 160 while the content is shared.

The first electronic device 310 may display state information, such as a volume of the output of the content, of the electronic devices outputting the content in the second area 821 when the content sharing function is activated. The first electronic device 310 may control the electronic devices outputting the content in response to the user input received in the second area 821. The first electronic device 310 may distinctively display the electronic devices outputting the content when the content sharing function is activated. For example, although not illustrated, the first electronic device 310 may visually distinctively display, such as images and/or text, the electronic device connected with the first electronic device 310 through the first communication and the electronic device connected to the second electronic device through the first communication.

Figure 9A:
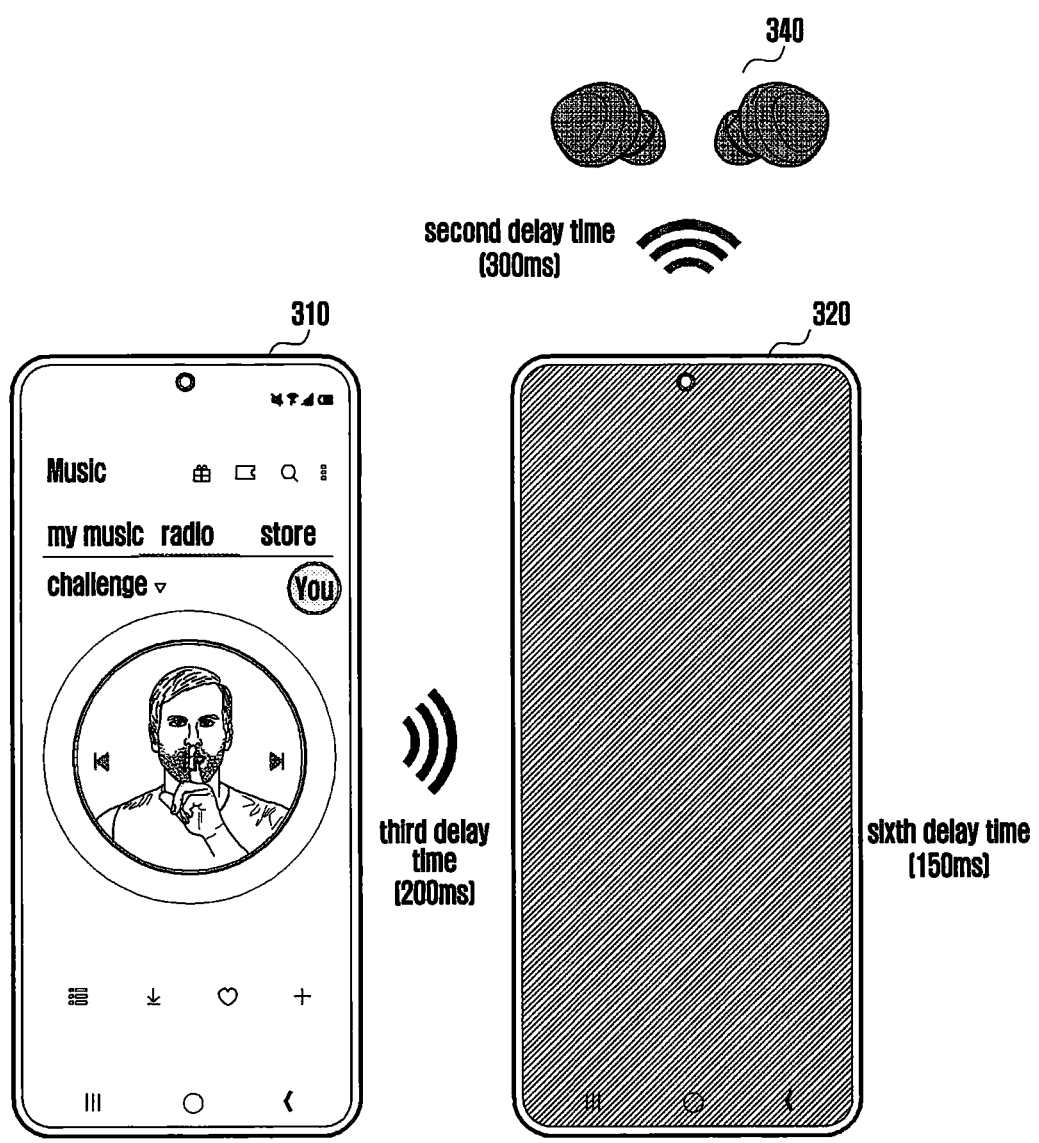
FIG. 9A illustrates a method of controlling the content transmission time according to the delay time of the first electronic device, the second electronic device, the first external electronic device, and/or the second external electronic device according to a first embodiment.
Figure 9B:
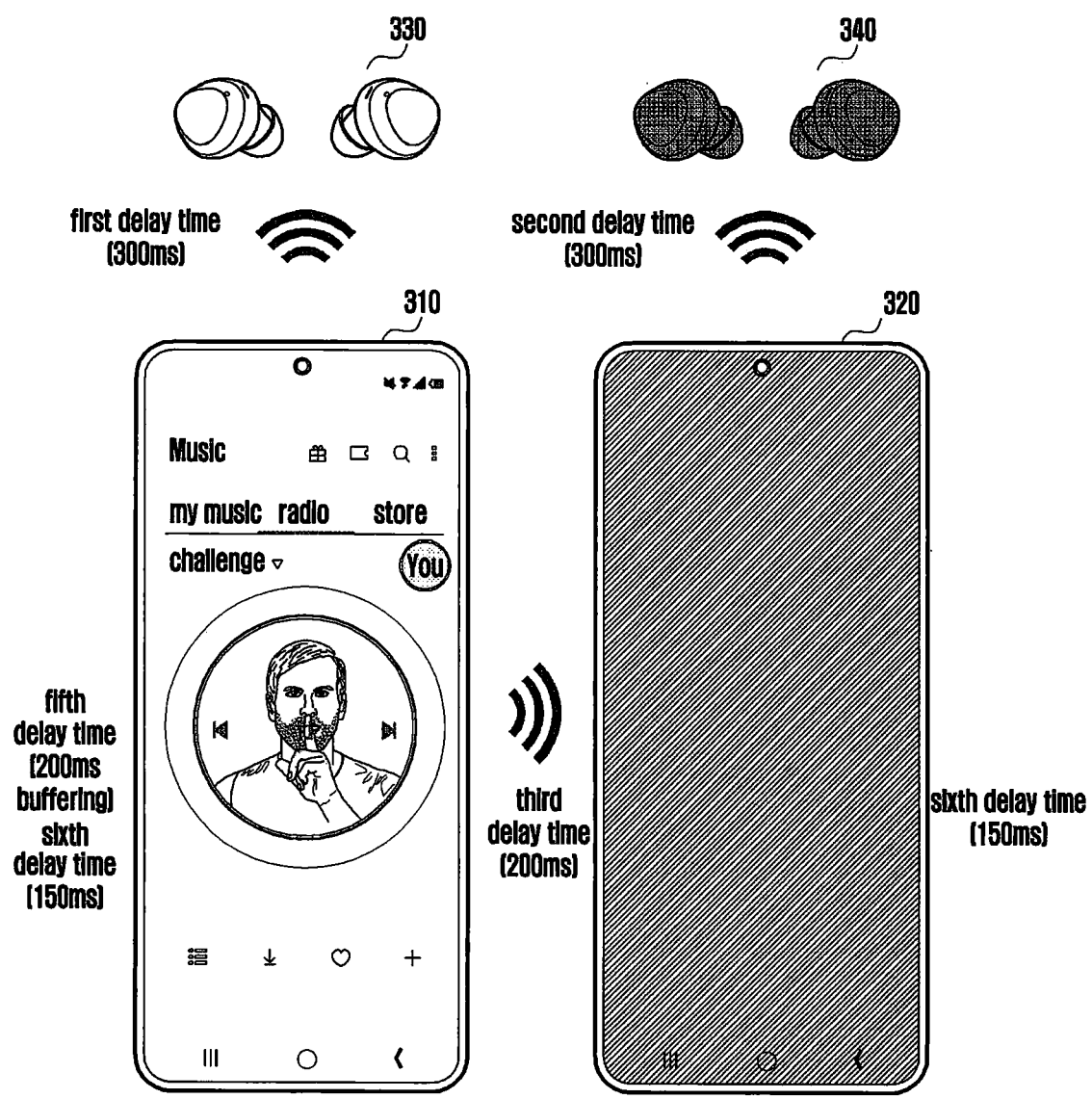
FIG. 9B illustrates a method of controlling the content transmission time according to the delay time of the first electronic device, the second electronic device, the first external electronic device, and/or the second external electronic device according to a second embodiment.

FIG. 9A illustrates a method of controlling the content transmission time according to the delay time of the first electronic device, the second electronic device, the first external electronic device, and/or the second external electronic device according to a first embodiment and FIG. 9B illustrates a method of controlling the content transmission time according to the delay time of the first electronic device, the second electronic device, the first external electronic device, and/or the second external electronic device according to a second embodiment.

FIG. 9A illustrates the first electronic device 310 transmitting data including at least some of the content to the second electronic device 320 through the second communication and the second electronic device 320 transmitting the data including at least some of the content to the second external electronic device 340 through the first communication when the content sharing function is activated.

The second electronic device 320 may receive the data including at least some of the content after a third delay time, such as 200 ms, from transmission of the data including at least some of the content by the first electronic device 310. For example, the third delay time may include a difference between a time when the first electronic device 310 starts processing for transmission of the content through the second communication, such as converting the content into a packet form, and a time when the second electronic device 320 receives the content through the second communication and processes the same. The second electronic device 320 may transmit the data including at least one some of the content to the second external electronic device 340 after a sixth delay time, such as 150 ms, generated by the operation of processing for transmission of the received content to the second external electronic device 340. The second external electronic device 340 may output the content after a second delay time, such as 300 ms, from transmission of the data including at least some of the content by the second electronic device 320.

The second external electronic device 320 may output the content after a sum of the third delay time, the sixth delay time, and the second delay time (650 ms=200 ms+150 ms+300 ms) from transmission of the data including at least some of the content by the first electronic device 310.

FIG. 9B illustrates the first electronic device 310 transmitting data including at least some of the content to the first external electronic device 330 through the first communication and to the second electronic device 320 through the second communication, and the second electronic device 320 transmitting the data including at least some of the content to the second external electronic device 340 through the first communication when the content sharing function is activated.

|As illustrated in FIG. 9A|[RC5], the second external electronic device 320 may output the content after a sum of the third delay time, the sixth delay time, and the second delay time, i.e., 650 ms=200 ms+150 ms+300 ms, from transmission of the content by the first electronic device 310.

The first electronic device 310 may transmit the data including at least some of the content to the first external electronic device 330 after the sixth delay time, such as 150 ms, generated by the operation of processing for transmission of the content to the first external electronic device 330. The first external electronic device 330 may output the content after the first delay time, such as 300 ms, from transmission of the data including at least some of the content by the first electronic device 310. The first external electronic device 330 may output the content after a sum of the sixth delay time and the first delay time, i.e., 450 ms=150 ms+300 ms, from a time point at which processing for transmission of the content is started by the first electronic device 310.

The time point at which the first external electronic device 330 outputs the content may be earlier than the time point at which the second external electronic device 340 outputs the content by 200 ms, and thus the content may not be synchronized.

After transmitting the content to the second electronic device 320 through the second communication, the first electronic device 310 may buffer the content during the fifth delay time (a difference between the first delay time and the fourth delay time, 500 ms−300 ms=200 ms) and delay transmission of the data including at least some of the content to the first external electronic device 330. The first electronic device 310 may buffer the content by temporarily storing the content in a buffer. Through the above method, the first electronic device 310 may transmit the data including at least some of the content to the first external electronic device 330 at the time point later than the time point at which the data including at least some of the content is transmitted to the second electronic device 320 by the fifth delay time, such as 200 ms, so as to substantially match the time point at which the first external electronic device 220 outputs the content and the time point at which the second external electronic device 340 outputs the content and implement synchronization of output of the content.

FIGS. 4 and 5 describe the embodiment of implementing synchronization of output of the content without consideration of the sixth delay time. However, in FIGS. 4 and 5 it is assumed that the time for which the first electronic device 310 performs processing for transmission of the content is substantially the same as the time for which the second electronic device 320 performs processing for transmission of the content.

The time for which the first electronic device 310 performs processing for transmission of the content may be different from the time for which the second electronic device 320 performs processing for transmission of the content. When the time for which the first electronic device 310 performs processing for transmission of the content is different from the time for which the second electronic device 320 performs processing for transmission of the content, the first electronic device 310 may consider the sixth delay time. For example, the first electronic device 310 may control a time, such as fifth delay time) for which the content is buffered to transmit the content to the first external electronic device 330 based on the time for which the first electronic device 310 performs processing for transmission of the content to the first external electronic device 330 and the time for which the second electronic device 320 performs processing for transmission of the content to the second external electronic device 340.

Figure 10A:
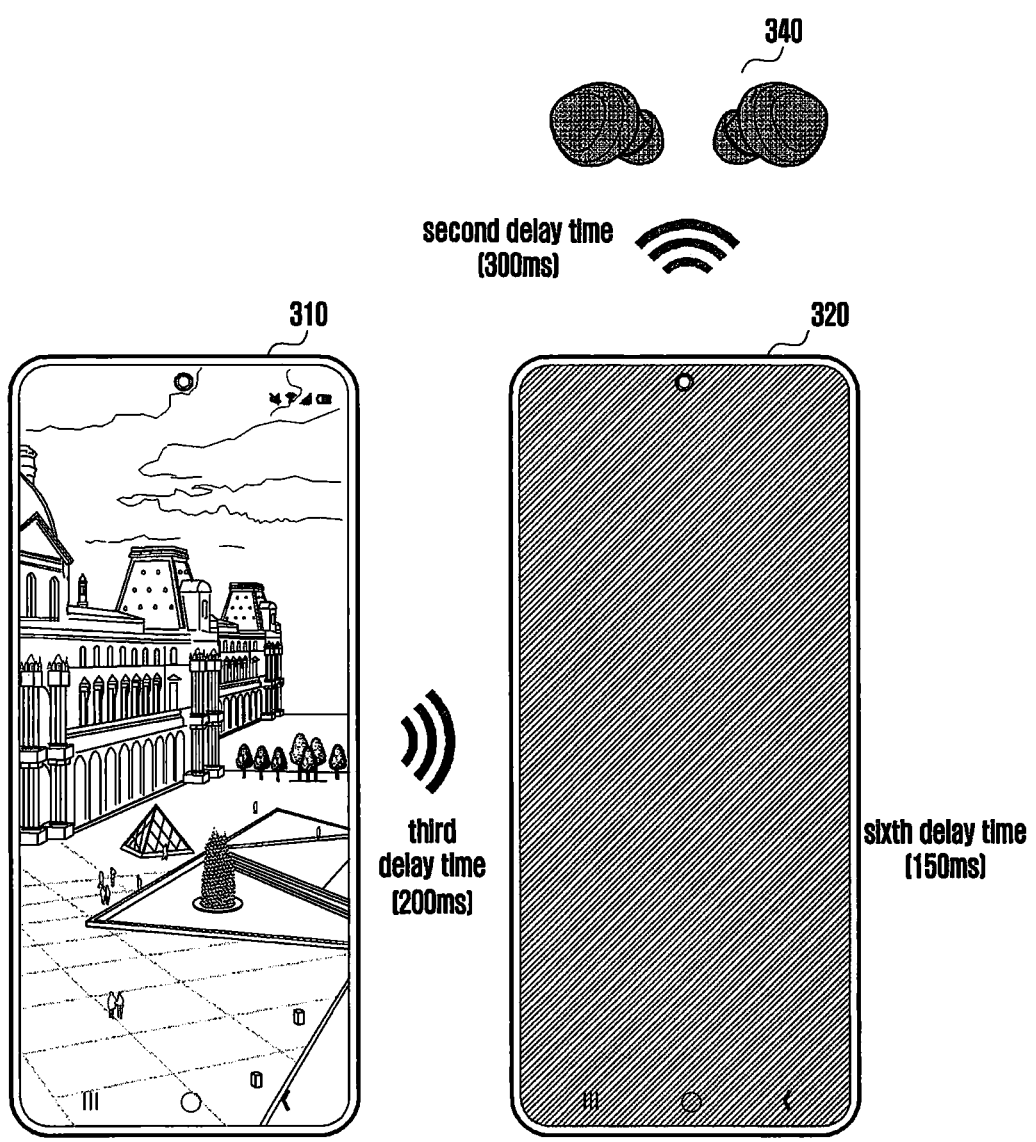
FIG. 10A illustrates the first electronic device delaying displaying of content according to a delay time of the first external electronic device and a delay time of the second external electronic device according to a first embodiment.
Figure 10B:
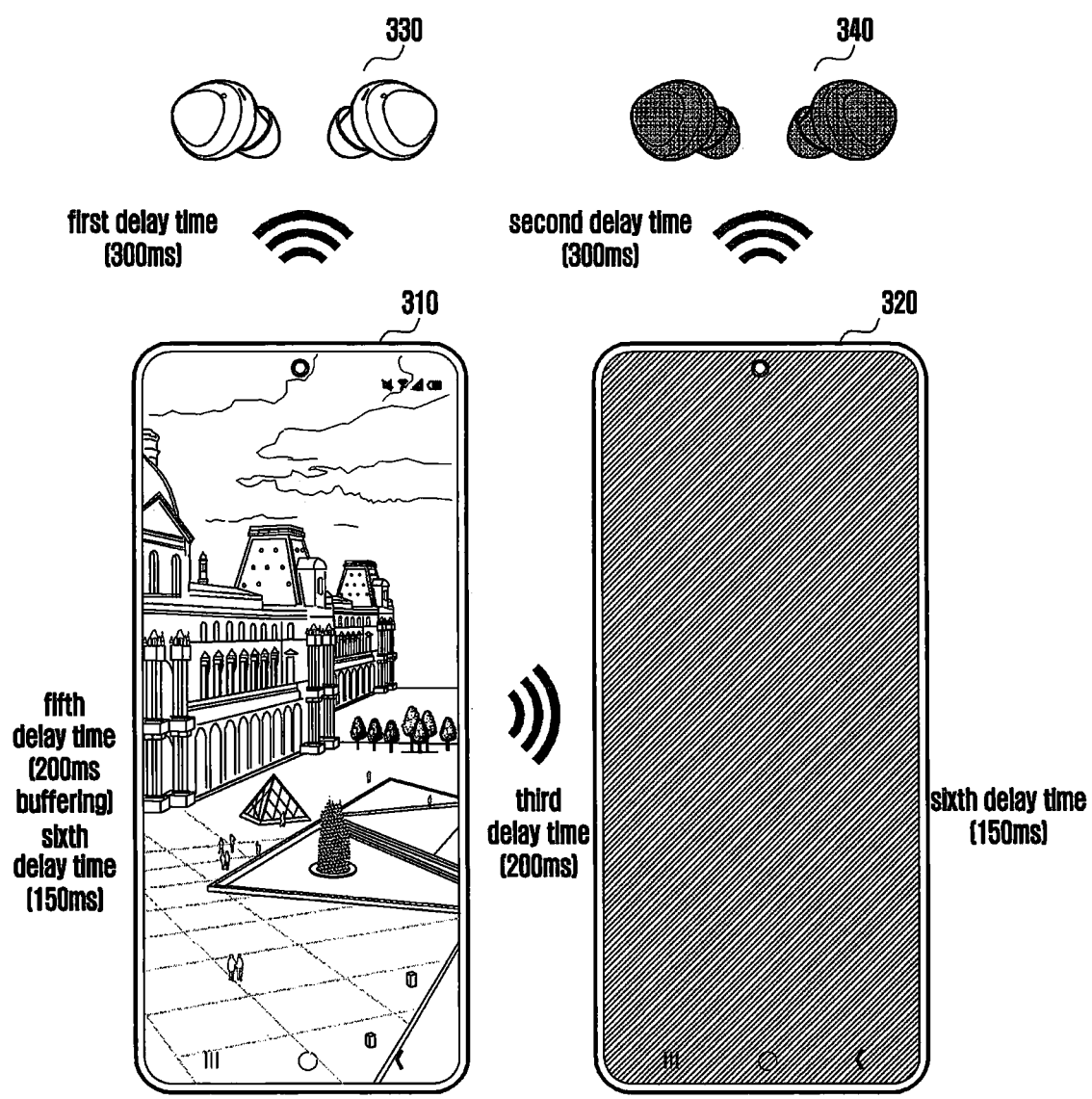
FIG. 10B illustrates the first electronic device delaying displaying of content according to a delay time of the first external electronic device and a delay time of the second external electronic device according to a second embodiment.

FIG. 10A illustrates a first electronic device delaying displaying of content according to a delay time of a first external electronic device and a delay time of a second external electronic device according to a first embodiment, and FIG. 10B illustrates a first electronic device delaying displaying of content according to a delay time of a first external electronic device and a delay time of a second external electronic device according to a second embodiment.

FIG. 10A illustrates the first electronic device 310 transmitting data including at least some of the content to the second electronic device 320 through the second communication and the second electronic device 320 transmitting the data including at least some of the content to the second external electronic device 340 through the first communication when the content sharing function is activated.

As illustrated in FIG. |10A[RC6], the second external electronic device 320 may output the content after a sum of the third delay time, the sixth delay time, and the second delay time, i.e., 650 ms=200 ms+150 ms+300 ms, from transmission of the data including at least some of the content by the first electronic device 310.

The first electronic device 310 may control a time of starting displaying the content displayed on the display of the first electronic device 310 based on the sum (650 ms) of the third delay time, the sixth delay time, and the second delay time, so as to implement synchronization of the content display time. The first electronic device 310 may delay the operation of displaying the content based on the sum (650 ms) of the third delay time, the sixth delay time, and the second delay time. Through the above method, it is possible to substantially match the time point at which the operation of displaying the content starts and the time point at which the second external electronic device 340 starts outputting the content, thereby implementing synchronization of the output of the content.

FIG. 10B illustrates the first electronic device 310 transmitting data including at least some of the content to the first external electronic device 330 through the first communication and to the second electronic device 320 through the second communication, and the second electronic device 320 transmitting the data including at least some of the content to the second external electronic device 340 through the first communication when the content sharing function is activated.

As illustrated in FIG. |10B|[RC7], the second external electronic device 320 may output the content after a sum of the third delay time, the sixth delay time, and the second delay time, i.e., 650 ms=200 ms+150 ms+300 ms, from transmission of the data including at least some of the content by the first electronic device 310.

After transmitting the data including at least some of the content to the second electronic device 320 through the second communication, the first electronic device 310 may buffer the content for a fifth delay time (difference between the first delay time and the fourth delay time, 500 ms−300 ms=200 ms) and delay transmission of the content to the first external electronic device 330. The first electronic device 310 may buffer the content by temporarily storing the content in a buffer. Through the above method, the first electronic device 310 may transmit the content to the first external electronic device 330 at a time point later than the time point at which the content is transmitted to the second electronic device 320 by the fifth delay time of 200 ms.

The first electronic device 310 may control a time of starting displaying the content displayed on the of the first electronic device 310 based on the sum (650 ms) of the third delay time, the sixth delay time, and the second delay time, so as to implement synchronization of the content display time. The first electronic device 310 may delay the operation of displaying the content based on the sum (650 ms) of the third delay time, the sixth delay time, and the second delay time.

Through the above method, the first electronic device 310 may substantially match the time point at which the first external electronic device 330 outputs the content, the time point at which the second external electronic device 340 outputs the content, and the time point at which the first electronic device 310 displays the content, so as to implement synchronization of the output of the content.

As qualities of the connection between the first electronic device 310 and the second electronic device 320 through the second communication, the connection between the first electronic device 310 and the first external electronic device 330 through the first communication, and/or the connection between the second electronic device 320 and the second external electronic device 340 are changed, the first delay time, the second delay time, and/or the third delay time may be changed.

The change in the first delay time, the second delay time, and/or the third delay time may generate non-synchronization of the output of the content. For example, the first delay time may be changed from 300 ms to 200 ms, the second delay time may be changed from 300 ms to 250 ms, and the third delay time may be changed from 200 ms to 300 ms. When the fifth delay time of 200 ms is maintained according to the generation of the above situation, the time for which the content is output from the first external electronic device 330 may be 550 ms due to a decrease of 100 ms, the time for which the content is output from the second external electronic device 340 may be 700 ms due to an increase of 50 ms, and the time for which the display of the content by the first electronic device 310 is delayed may be 650 ms that is the same as that before the change in the quality. The change in the first delay time, the second delay time, and/or the third delay time may generate non-synchronization of the output of the content.

The first electronic device 310 may detect the change in the first delay time, the second delay time, and/or the third delay time every time, and control the time for which the first electronic device 310 displays the content in response to the detection of the change.

The first electronic device 310 may synchronize the content output time point of one of the first external electronic device 330 and the second external electronic device 340 and the content display time of the first electronic device 310.

The first electronic device 310 may synchronize the content output time point of the second external electronic device 340 and the content display time point of the first electronic device 310. The first electronic device 310 may synchronize the content display time point of the first electronic device 310 based on a change in a second time (a sum of the second delay time and the third delay time). For example, the first electronic device 310 may further delay the content display operation by 50 ms in order to substantially match the content output time point (700 ms) and the content display time point of the second external electronic device 340. In another example, the fifth delay time may be further delayed by 150 ms, such as the content being buffered by 350 ms, in order to substantially match the content output time point (700 ms) of the second external electronic device 340 and the content output time point of the first external electronic device 330.

The first electronic device 310 may synchronize the content output time point of the first external electronic device 330 and the content display time point of the first electronic device 310. The first electronic device 310 may synchronize the content display time point of the first electronic device 310 based on a change in a first time (first delay time). For example, the first electronic device 310 may perform the content display operation by 100 ms earlier in order to substantially match the content output time point (550 ms) and the content display time point of the first external electronic device 330.

The first electronic device 310 may select an external electronic device to perform synchronization based on priorities of the first external electronic device 330 and the second external electronic device 340 and synchronize the content output time point of the selected external electronic device and the content display time point of the first electronic device 310.

The first electronic device 310 may detect changes in the first delay time, the second delay time, and/or the third delay time, and synchronize the content display time points of the first external electronic device 330, the second external electronic device 340, and/or the first electronic device 310 based on the longest delay time among them.

The first electronic device 310 may control the content output time point of the first external electronic device 330, the content output time point of the second external electronic device 340, and/or the content display time point of the first electronic device 310 based on the change in the first time and the change in the second time.

The first electronic device 310 may identify the change in the first time (−100 ms such that the content is output earlier than before by 100 ms) and the change in the second time (+50 ms such that the content is output later than before by 50 ms), and identify an average (−25 ms) of the change in the first time and the change in the second time. The first electronic device 310 may control the content display time point of the first electronic device 310 by the average of the changes. For example, the first electronic device 310 may change the content display time point of the first electronic device 310 to be earlier by 25 ms.

The first electronic device 310 may control the content display time point of the first electronic device 310 such that a difference between the content display time point and the content output time point of the first external electronic device 330 is included within a predetermined range, such as +125 ms to −45 ms, and control the content display time point of the first electronic device 310 such that a difference between the content display time point and the content output time point of the second external electronic device 340 is included within a predetermined range, such as −+125 ms to −45 ms. The predetermined range may be a range within which the user may feel that the content output time points are substantially the same. For example, the predetermined range may be implemented as a difference value between a sound output time point and a video output time point and may be between a value (−45 ms) of the sound output time point that is 45 ms earlier than the video output time point and a value (+125 ms) of the sound output time point that is 125 ms later than the video output time point.

Figure 11A:
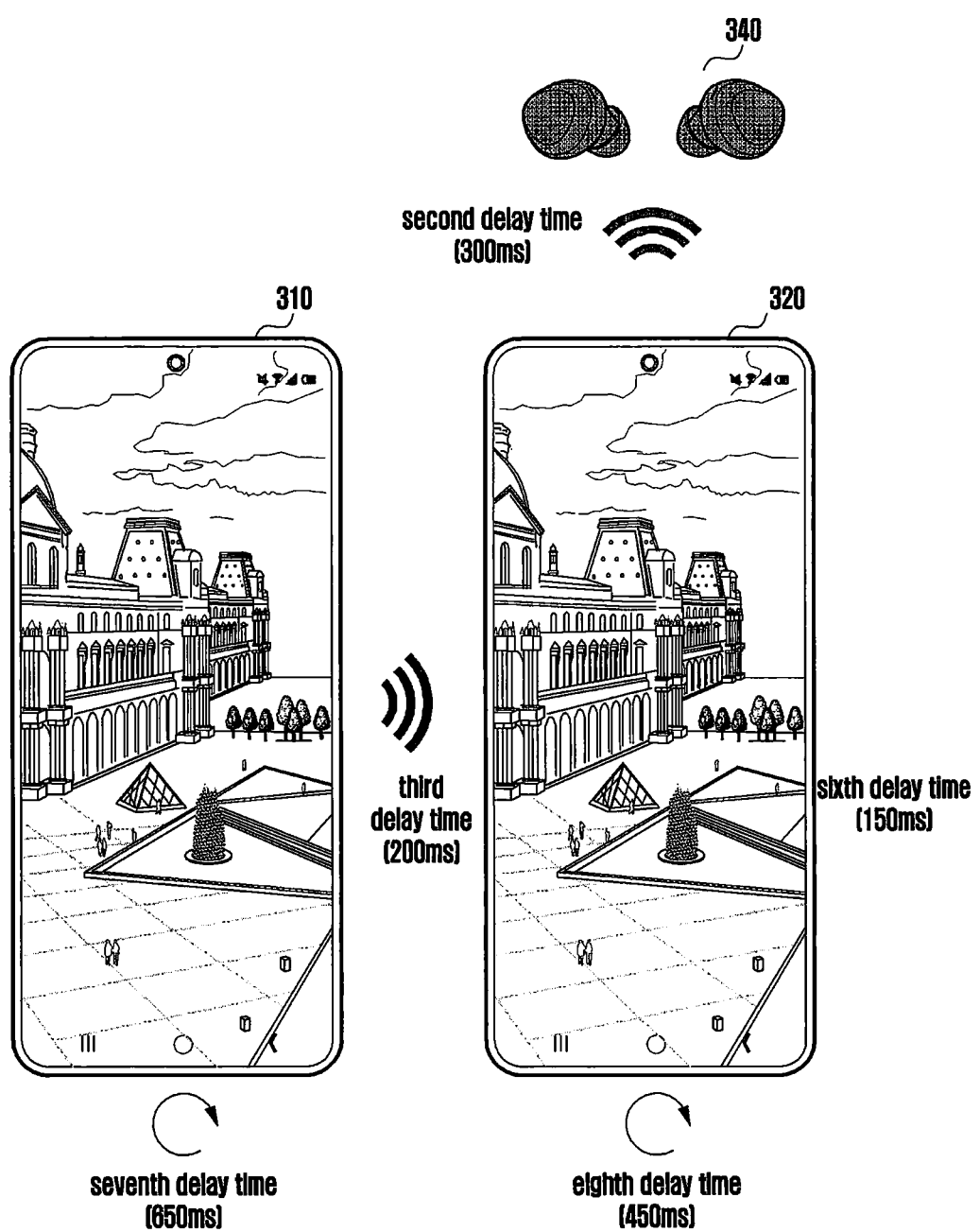
FIG. 11A illustrates the first electronic device and the second electronic device delaying displaying of content according to a delay time of the first external electronic device and a delay time of the second external electronic device according to an embodiment.
Figure 11B:
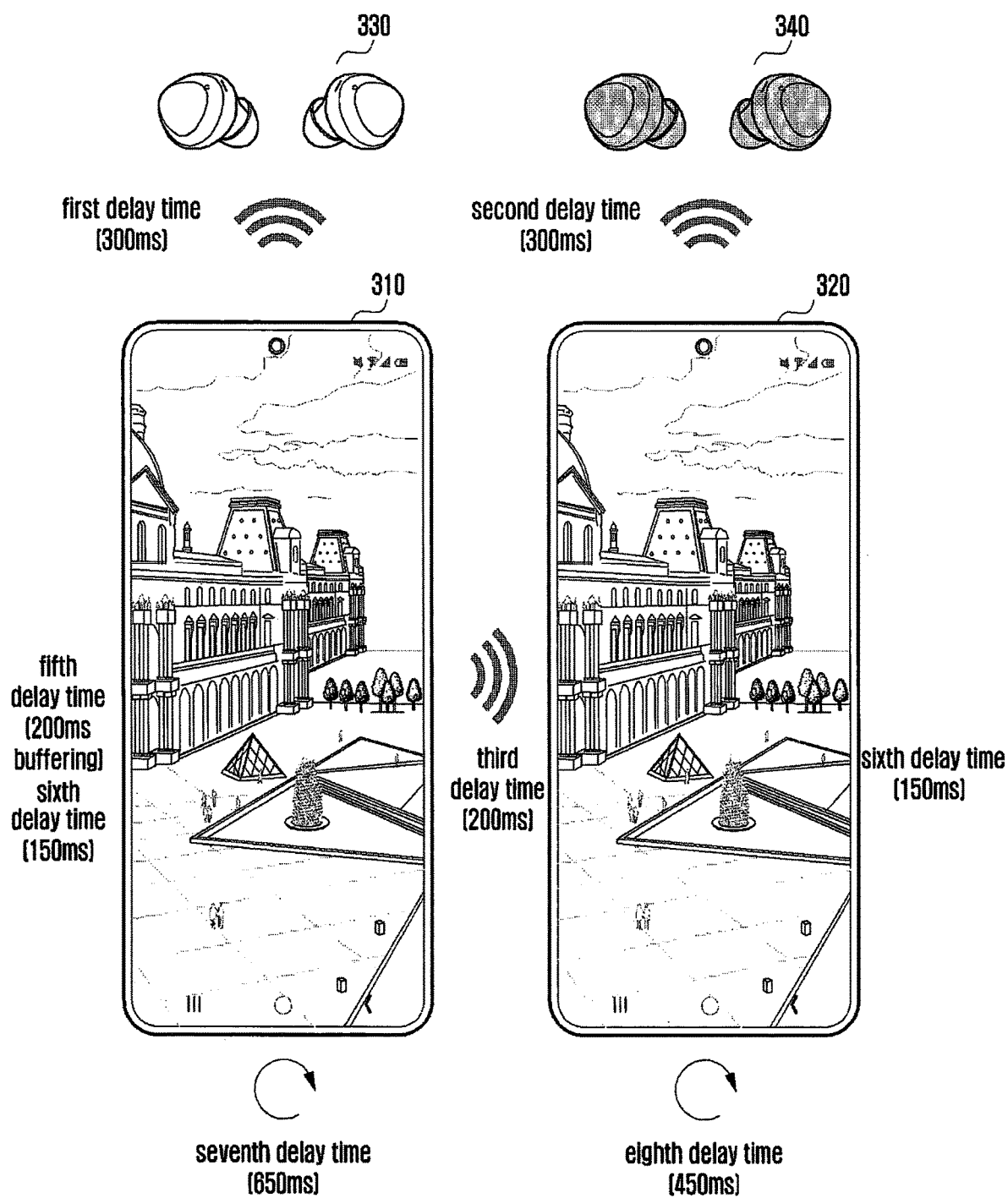
FIG. 11B illustrates the first electronic device and the second electronic device delaying displaying of content according to a delay time of the first external electronic device and a delay time of the second external electronic device according to a second embodiment.

FIG. 11A illustrates a first electronic device and a second electronic device delaying displaying of content according to a delay time of a first external electronic device and a delay time of a second external electronic device according to a first embodiment, and FIG. 11B illustrates a first electronic device and a second electronic device delaying displaying of content according to a delay time of a first external electronic device and a delay time of a second external electronic device according to a second embodiment.

FIG. 11A illustrates the first electronic device 310 transmitting content to the second electronic device 320 through second communication and the second electronic device 320 transmitting content to the second external electronic device 340 through first communication when the content sharing function is activated.

As illustrated in FIG. |11A|[RC8], the second external electronic device 320 may output the content after a sum of the third delay time, the sixth delay time, and the second delay time, such as 650 ms=200 ms+150 ms+300 ms) from transmission of the content by the first electronic device 310.

The first electronic device 310 may control a display start time of content displayed on the display of the first electronic device 310 based on a seventh delay time, so as to implement synchronization of the content display time. The seventh delay time may be of a display operation of the first electronic device 310 for synchronization of a content display operation and a voice content output operation. The first electronic device 310 may determine the seventh delay time based on the third delay time, the sixth delay time, and the second delay time.

The first electronic device 310 may determine (or configure) a sum (650 ms) of the third delay time, the sixth delay time, and the second delay time as the seventh delay time. The first electronic device 310 may delay the content display operation based on the seventh delay time that is the sum (650 ms) of the third delay time, the sixth delay time, and the second delay time. Through the above method, it is possible to substantially match the time point at which the content display operation is started by the first electronic device 310 and the time point at which the content output is started by the second external electronic device 340, thereby implementing synchronization of the content output.

The second electronic device 320 may control the display start time of the content displayed in the display, such as the display module 160 of FIG. 1) of the second electronic device 320 based on an eighth delay time, so as to implement synchronization of the content display time. The eighth delay time may be a delay time of a display operation of the second electronic device 320 for synchronization of the content display operation and the voice content output operation. The second electronic device 320 may determine the eighth delay time based on the second delay time and the sixth delay time. The second electronic device 320 may determine (or configure) a sum (450 ms) of the second delay time and the sixth delay time as an eighth delay time. The second electronic device 320 may delay the content display operation by the eighth delay time (45 ms) corresponding to a sum (150 ms) of the second delay time (300 ms) and the sixth delay time (150 ms). The time point at which the content is displayed in the second electronic device 320 may be 650 ms that is a sum of the time (third delay time (200 ms)) spent for transmission of the content from the first electronic device 310 to the second electronic device 320 and the delay time (450 ms) of the content display operation. Through the above method, it is possible to substantially match the content output time point of the second electronic device 320 with the time point at which the content display operation is started by the first electronic device 310 and the time point at which the content output is started by the second external electronic device 340, thereby implementing synchronization of the content output.

FIG. 11B illustrates the first electronic device 310 transmitting content to the first external electronic device 330 through the first communication and to the second electronic device 320 through the second communication, and the second electronic device 320 transmitting the content to the second external electronic device 340 through the first communication when the content sharing function is activated.

As illustrated in FIG. |11B|[RC9], the second external electronic device 320 may output the content after a sum of the third delay time, the sixth delay time, and the second delay time, such as 650 ms=200 ms+150 ms+300 ms) from transmission of the content by the first electronic device 310.

After transmitting the content to the second electronic device 320 through the second communication, the first electronic device 310 may buffer the content for the fifth delay time (a difference between the first delay time and the fourth delay time, 500 ms−300 ms=200 ms) and delay transmission of the content to the first external electronic device 330. The first electronic device 310 may buffer the content by temporarily storing the content in a buffer. Through the above method, the first electronic device 310 may transmit the content to the first external electronic device 330 at the time point 200 ms later than the time point at which the content is transmitted to the second electronic device 320. Through the above method, the first external electronic device 330 may receive the content after the fifth delay time (200 ms) and the sixth delay time (150 ms) and output the content after the first delay time (300 ms), the fifth delay time (200 ms), and the sixth delay time (150 ms).

The first electronic device 310 may control the display start time of the content displayed on the display of the first electronic device 310 based on the seventh delay time (650 ms) that is a sum of the third delay time, the sixth delay time, and the second delay time, thereby implementing synchronization of the content display time. The first electronic device 310 may delay the content display operation based on the seventh delay time (650 ms).

The second electronic device 320 may control the display start time of the content displayed on the display of the second electronic device 320. The second electronic device 320 may delay the content display operation by the eighth delay time (450 ms) corresponding to a sum of the second delay time (300 ms) and the sixth delay time (150 ms). The time point at which the content is displayed in the second electronic device 320 may be 650 ms that is a sum of the time (third delay time (200 ms)) spent for transmission of the content from the first electronic device 310 to the second electronic device 320 and the delay time (450 ms) of the content display operation. Through the above method, it is possible to substantially match the content output time point of the second electronic device 320 with the time point at which the display operation is started by the first electronic device 310 and the time point at which the content output is started by the second external electronic device 340, thereby implementing synchronization of the content output.

When transmitting the content to the second electronic device 320 through the second communication, the first electronic device 310 may make a request for delaying the time point at which the second electronic device 320 displays the content on the second electronic device 320 based on a sum of 450 ms of the sixth delay time and the second delay time.

Referring to FIGS. 11A and 11B, the first electronic device 310 and the second electronic device 320 display the same screen, but the disclosure is not limited thereto. According to an embodiment, the first electronic device 310 may display a part of the content and the second electronic device 320 may display another part of the content. A screen displayed by the first electronic device 310 and a screen displayed by the second electronic device 320 may configure one piece of content.

An electronic device (for example, the first electronic device 310 of FIG. 3) according to various embodiments may include a first communication circuit (for example, the first communication circuit 520 of FIG. 5) configured to transmit content to a first external electronic device (for example, the first external electronic device 330 of FIG. 3) through first communication; a second communication circuit (for example, the second communication circuit 530 of FIG. 5) configured to transmit content to a second electronic device (for example, the second electronic device 320 of FIG. 3) connected to a second external electronic device (for example, the second external electronic device 340 of FIG. 3) through second communication; and a processor (for example, the processor 510 of FIG. 5), wherein the processor 510 may be configured to identify a first time spent for processing a content output operation by the first external electronic device 330, identify a second time spent for processing a content output operation by the second external electronic device 340, and control a time for which the content is transmitted to the first external electronic device 330 and/or the second electronic device 320 on the basis of a result of comparison between the first time and the second time.

In the electronic device 310 according to various embodiments, the processor 510 may be configured to delay the transmission of the content to the first external electronic device 330 on the basis of a difference between the second time and the first time in response to the second time being longer than the first time.

In the electronic device 310 according to various embodiments, the processor 510 may be configured to buffer the content to be transmitted to the first external electronic device 330 by the difference between the second time and the first time and control the first communication circuit 520 to transmit dummy data to the first external electronic device 330 while the content is buffered.

In the electronic device 310 according to various embodiments, the dummy data may be data for maintaining a mode in which the first external electronic device 330 stands by for transmission of the content.

In the electronic device 310 according to various embodiments, the processor 510 may be configured to identify the second time on the basis of a time spent for transmission of the content from the electronic device 310 to the second electronic device 320 through the second communication and a time spent for transmission of the content from the second electronic device 320 to the second external electronic device 340.

In the electronic device 310 according to various embodiments, the processor 510 may be configured to control the second communication circuit 530 to transmit the content and the difference between the first time and the second time to the second electronic device 320 in response to the first time being longer than the second time.

In the electronic device 310 according to various embodiments, the processor 510 may be configured to control the second electronic device 320 to delay transmission of the content to the second external electronic device 340 on the basis of the difference between the second time and the first time.

In the electronic device 310 according to various embodiments, the processor 510 may be configured to delay a content display operation on the basis of a larger value among the first time and the second time and a time spent for processing the content by the electronic device 310.

In the electronic device 310 according to various embodiments, the processor 510 may be configured to control the second electronic device 320 to delay the content display operation on the basis of a sum of the larger value among the first time and the second time and the time spent for processing the content by the electronic device 310.

In the electronic device 310 according to various embodiments, the processor 510 may be configured to control a delay time of the content display operation on the basis of a change in at least one of the first time and the second time.

In the electronic device 310 according to various embodiments, the processor 510 may be configured to control the delay time of the content display operation on the basis of a change in a time corresponding to an external electronic device having a higher priority among the first external electronic device 330 and the second external electronic device 340.

In the electronic device 310 according to various embodiments, the processor 510 may be configured to control the delay time of the content display operation on the basis of an average of a change in the first time and a change in the second time.

In the electronic device 310 according to various embodiments, the processor 510 may be configured to control the first communication circuit 520 to transmit a control signal corresponding to a user input to the first external electronic device 330 in response to reception of the user input related to reproduction of the content and control the second communication circuit 530 to transmit the control signal to the second electronic device 320.

Figure 12:
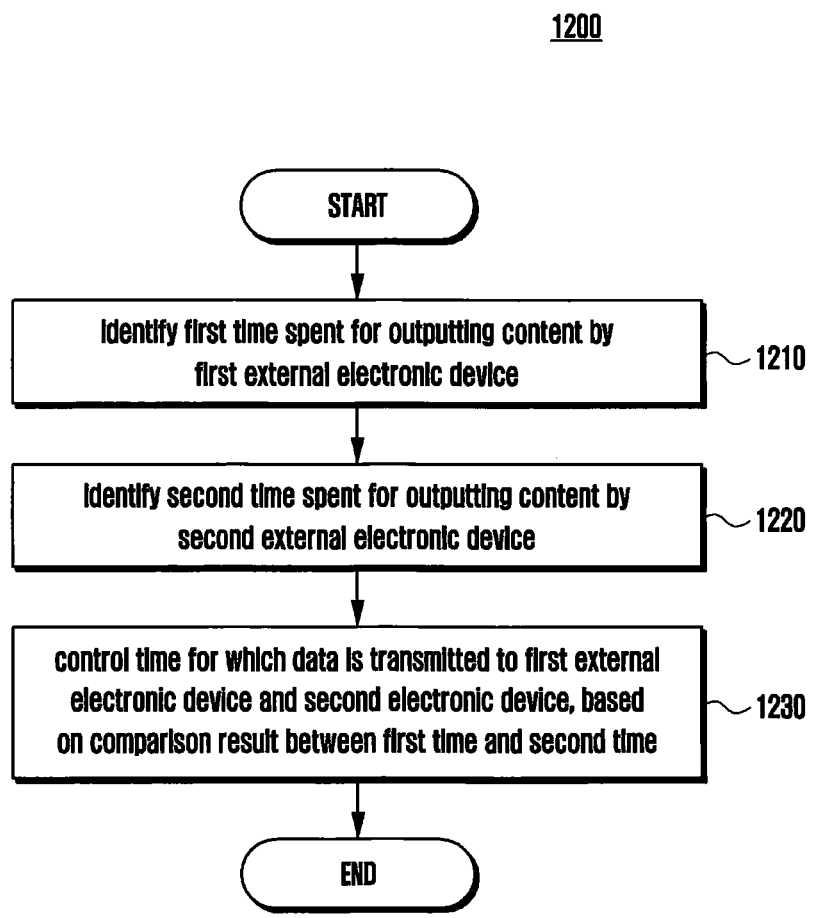
FIG. 12 illustrates a method of operating the first electronic device according to an embodiment.

FIG. 12 illustrates a method 1200 of operating a first electronic device according to an embodiment.

The first electronic device may identify a first time spent for outputting content by the first external electronic device in step 1210.

The first time may be a time spent for processing the content output operation by the first external electronic device 330.

The first electronic device 310 may transmit a signal requesting transmitting first time information including the first time to the first external electronic device 330 through the first communication. The first external electronic device 330 may identify the first time based on a difference between the time when the first electronic device 310 transmits the content to the first external electronic device 330 and the time when the first external electronic device 330 outputs the content. The first external electronic device 330 may generate the first time information in response to reception of the signal requesting transmission of the first time information by the first electronic device 310.

The first electronic device 310 may identify the first time based on the first time information transmitted by the first external electronic device 330.

The first electronic device 310 may identify a second time spent for outputting the content by the second external electronic device in step 1220.

The second time may include a time spent from a time when the first electronic device 310 transmits the content to the second electronic device 320 to a time when the second external electronic device 340 outputs the content.

The first electronic device 310 may transmit a signal requesting second time information including the second time to the second electronic device 320 through the second communication. Alternatively, when the first external electronic device 330 can transmit the first time information regardless of reception of the signal requesting transmission of the first time information, the first electronic device 310 may receive the first time information from the first external electronic device 330 without performing the operation of transmitting the signal requesting transmission of the first time information. The first electronic device 310 may receive the first time information while the connection with the first external electronic device 330 through the first communication is made.

The second electronic device 320 may determine the second time based on the second delay time and the third delay time. For example, the second electronic device 320 may determine a sum of the second delay time and the third delay time as the second time.

The first electronic device 310 may control the transmission time of data including at least some of the content to the first external electronic device 330 and the second electronic device 320 based on the result of comparison between the first time and the second time in step 1230.

The processor may compare the first time and the second time. A difference between the first time and the second time may include a difference between a time when the content is output from the first external electronic device 330 and a time when the content is output from the second external electronic device 340.

A situation in which the second time is longer than the first time is a state in which the time when the content is output from the first external electronic device 330 is earlier than the time when the content is output from the second external electronic device 340, and may include non-synchronization of the content.

A situation in which the first time is longer than the second time is a state in which the time when the content is output from the second external electronic device 340 is earlier than the time when the content is output from the first external electronic device 330, and may include non-synchronization of the content.

The first electronic device 310 may control the transmission time of data including at least some of the content to be transmitted to the first external electronic device 330 and/or the second electronic device 320 based on the result of comparison between the first time and the second time.

The first electronic device 310 may delay transmission of the data including at least some of the content to the first external electronic device in response to identifying that the second time is longer than the first time. The first electronic device 310 may transmit the data including at least some of the content to the first external electronic device 330 through the first communication after a third time corresponding to a difference between the second time and the first time from transmission of the data including at least some of the content to the second electronic device 320 through the second communication.

After transmitting the data including at least some of the content to the second electronic device 320 through the second communication, the first electronic device 310 may buffer the content for the third time and delay transmission of the data including at least some of the content to the first external electronic device 330. The first electronic device 310 may buffer the content by temporarily storing the content in a buffer. The buffer may be implemented in the first communication circuit, such as the first communication circuit 520 of FIG. 5), the processor 510, or the memory 130.

The first electronic device 310 may transmit dummy data to the first external electronic device 330 through the first communication while the content is buffered. For example, the dummy data may be data for maintaining a mode in which transmission of the content is in standby when the first external electronic device 330 cannot receive data including at least some of the content from the first electronic device 310. When the first external electronic device 330 cannot receive content for a predetermined time or longer, the first external electronic device may switch to an idle mode from the mode in which transmission of the content is in standby in order to reduce power consumption. The first external electronic device 330 may stand by transmission of the content without switching to the idle mode according to reception of the dummy mode. The dummy data may include no content, for example, silent data. The first external electronic device 330 may output the dummy data, so as to reduce (prevent) output of noise.

The first electronic device 310 may delay transmission of the content to the second electronic device 320 in response to identifying that the first time is longer than the second time. The first electronic device 310 may transmit the data including at least some of the content to the second electronic device 320 through the second communication after the third time from transmission of the data including at least some of the content to the first external electronic device 330 through the first communication.

The first electronic device 310 may transmit to the second electronic device 320, a signal requesting delaying transmission of the data including at least some of the content from the second electronic device 320 to the second external electronic device 340 along with the content in response to the first time being longer than the second time. For example, the signal requesting delayed transmission of the data including at least some of the content may include the third time.

After receiving the data including at least some of the content from the first electronic device 310 through the second communication, the second electronic device 320 may buffer the content for the third time and delay transmission of the data including at least some of the content to the second external electronic device 340. The second electronic device 320 may buffer the content by temporarily storing the content in a buffer. The buffer may be implemented in the second communication circuit 530, the processor 510, or the memory 130.

The second electronic device 320 may transmit dummy data to the second external electronic device 340 through the first communication while the content is buffered. For example, the dummy data may be data for maintaining a mode in which transmission of content is in standby when the second external electronic device 340 cannot receive the content from the second electronic device 320. When the second external electronic device 340 cannot receive content for a predetermined time or longer, the second external electronic device may switch to an idle mode from the mode in which transmission of the content is in standby in order to reduce power consumption. The second external electronic device 340 may stand by transmission of the content without switching to the idle mode according to reception of the dummy mode. The dummy data is, for example, data including no content and may be silent data. The second external electronic device may output the dummy data, so as to reduce (prevent) output of noise.

As described above, the first electronic device may control the transmission time of the data including at least some of the content to the second electronic device and/or the first external electronic device based on the result of comparison between the first delay time and the fourth delay time, so as to substantially match the content output time of the second external electronic device and the content output time of the first external electronic device and implement synchronization of the content output time.

A method of operating an electronic device (for example, the first electronic device 310 of FIG. 3) according to various embodiments may include an operation of identifying a first time spent for processing a content output operation by a first external electronic device (for example, the first external electronic device 330 of FIG. 3) connected to the electronic device through first communication, an operation of identifying a second time spent for processing a content output operation by a second external electronic device (for example, the second external electronic device 340 of FIG. 3) connected to a second electronic device (for example, the second electronic device 320 of FIG. 3) connected to the electronic device 310 through second communication, and an operation of controlling a time for which the content is transmitted to the first external electronic device 330 and/or the second electronic device 320 on the basis of a result of comparison between the first time and the second time.

In the method of operating the electronic device 310 according to various embodiments, the operation of controlling the time for which the content is transmitted may include an operation of delaying the transmission of the content to the first external electronic device 330 on the basis of a difference between the second time and the first time in response to the second time being longer than the first time.

The method of operating the electronic device 310 according to various embodiments may further include an operation of buffering the content to be transmitted to the first external electronic device 330 by the difference between the second time and the first time and an operation of transmitting dummy data to the first external electronic device 330 while the content is buffered.

In the method of operating the electronic device 310 according to various embodiments, the dummy data may be data for maintaining a mode in which the first external electronic device 330 stands by for transmission of the content.

In the method of operating the electronic device 310 according to various embodiments, the operation of identifying the second time may include an operation of identifying the second time on the basis of a time spent for transmission of the content from the electronic device 310 to the second electronic device 320 through the second communication and a time spent for transmission of the content from the second electronic device 320 to the second external electronic device 340.

The method of operating the electronic device 310 according to various embodiments may further include an operation of transmitting the content and the difference between the first time and the second time to the second electronic device 320 in response to the first time being longer than the second time and an operation of controlling the second electronic device 320 to delay transmission of the content to the second external electronic device 340 on the basis of the difference between the second time and the first time.

The method of operating the electronic device 310 according to various embodiments may further include an operation of delaying a content display operation on the basis of a larger value among the first time and the second time and a time spent for processing the content by the electronic device 310.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium, which indicates that the storage medium is a tangible device, and does not include a signal, but this expression does not differentiate between where data is semi-permanently stored in the storage medium and where the data is temporarily stored in the storage medium.

A method according to an embodiment may be included and provided in a computer program product traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first communication circuit configured to transmit content to a first external electronic device through first communication;
a second communication circuit configured to transmit content to a second electronic device connected to a second external electronic device through second communication; and
a processor configured to identify a first time spent for processing a content output operation by the first external electronic device, identify a second time spent for processing a content output operation by the second external electronic device, and control a time for which the content is transmitted to the first external electronic device and/or the second electronic device, based on a result of a comparison between the first time and the second time.

2. The electronic device of claim 1,
wherein the processor is further configured to delay the transmission of the content to the first external electronic device, based on a difference between the second time and the first time in response to the first time longer than the second time.

3. The electronic device of claim 2,
wherein the processor is further configured to buffer the content to be transmitted to the first external electronic device by the difference between the second time and the first time and control the first communication circuit to transmit dummy data to the first external electronic device while the content is buffered.

4. The electronic device of claim 3,
wherein the dummy data is for maintaining a mode in which the first external electronic device stands by for transmission of the content.

5. The electronic device of claim 1,
wherein the processor is further configured to identify the second time, based on a time spent for transmission of the content from the electronic device to the second electronic device through the second communication and a time spent for transmission of the content from the second electronic device to the second external electronic device.

6. The electronic device of claim 1,
wherein the processor is further configured to control the second communication circuit to transmit the content and the difference between the first time and the second time to the second electronic device in response to the first time being longer than the second time.

7. The electronic device of claim 6,
wherein the processor is further configured to control the second electronic device to delay transmission of the content to the second external electronic device, based on the difference between the second time and the first time.

8. The electronic device of claim 1,
wherein the processor is further configured to delay a content display operation, based on a larger value among the first time and the second time and a time spent for processing the content by the electronic device.

9. The electronic device of claim 8,
wherein the processor is further configured to control the second electronic device to delay the content display operation, based on a sum of a larger value among the first time and the second time and the time spent for processing the content by the electronic device.

10. The electronic device of claim 8,
wherein the processor is further configured to control a delay time of the content display operation, based on a change in at least one of the first time and the second time.

11. The electronic device of claim 10,
wherein the processor is further configured to control the delay time of the content display operation, based on a change in a time corresponding to an external electronic device having a higher priority among the first external electronic device and the second external electronic device.

12. The electronic device of claim 10,
wherein the processor is further configured to control the delay time of the content display operation, based on an average of a change in the first time and a change in the second time.

13. The electronic device of claim 1,
wherein the processor is further configured to control the first communication circuit to transmit a control signal corresponding to a user input to the first external electronic device in response to reception of the user input related to reproduction of the content and control the second communication circuit to transmit the control signal to the second electronic device.

14. A method of operating an electronic device, the method comprising:
identifying a first time spent for processing a content output operation by a first external electronic device connected to the electronic device through a first communication;
identifying a second time spent for processing a content output operation by a second external electronic device connected to a second electronic device connected to the electronic device through a second communication; and controlling a time for which the content is transmitted to the first external electronic device and/or the second electronic device, based on a result of a comparison between the first time and the second time.

15. The method of claim 14,
wherein controlling the time for which the content is transmitted comprises delaying the transmission of the content to the first external electronic device, based on a difference between the second time and the first time in response to the second time being longer than the first time.

16. The method of claim 15, further comprising:
buffering the content to be transmitted to the first external electronic device by the difference between the second time and the first time; and
transmitting dummy data to the first external electronic device while the content is buffered.

17. The method of claim 16,
wherein the dummy data is for maintaining a mode in which the first external electronic device stands by for transmission of the content.

18. The method of claim 14,
wherein the second time is identified based on a time spent for transmission of the content from the electronic device to the second electronic device through the second communication and a time spent for transmission of the content from the second electronic device to the second external electronic device.

19. The method of claim 14, further comprising:
transmitting the content and the difference between the first time and the second time to the second electronic device in response to the first time being longer than the second time; and
controlling the second electronic device to delay transmission of the content to the second external electronic device, based on the difference between the second time and the first time.

20. The method of claim 14, further comprising delaying a content display operation, based on a larger value among the first time and the second time and a time spent for processing the content by the electronic device.

* * * * *